(12) United States Patent
Iwata et al.

(10) Patent No.: US 6,467,147 B2
(45) Date of Patent: *Oct. 22, 2002

(54) MAGNETO ELECTRIC GENERATOR ROTOR AND AN IMPLEMENT FOR REMOVING THIS ROTOR

(75) Inventors: Masao Iwata, Yokosuka (JP); Yoshiki Kitamura, Yokohama (JP); Norio Kawai, Sayama (JP)

(73) Assignee: Oppama Industry Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/419,925

(22) Filed: Oct. 18, 1999

(65) Prior Publication Data

US 2002/0047421 A1 Apr. 25, 2002

Related U.S. Application Data

(62) Division of application No. 08/882,955, filed on Jun. 26, 1997, now Pat. No. 6,023,828, which is a division of application No. 08/641,647, filed on May 1, 1996, now Pat. No. 5,811,908.

(30) Foreign Application Priority Data

| May 2, 1995 | (JP) | 7-132689 |
| May 2, 1995 | (JP) | 7-132690 |
| Jul. 5, 1995 | (JP) | 7-192487 |
| Jul. 20, 1995 | (JP) | 7-206455 |
| Jul. 27, 1995 | (JP) | 7-210977 |

(51) Int. Cl.$^7$ ................................................ B23P 11/00
(52) U.S. Cl. ................................... 29/426.5; 310/42
(58) Field of Search ................... 310/42, 153; 29/260, 29/259, 426.5, 261, 256, 264

(56) References Cited

U.S. PATENT DOCUMENTS

| 1,589,015 A | * | 6/1926 | Lee | 29/260 |
| 3,696,496 A | * | 10/1972 | Corder | 29/260 |
| 3,846,898 A | * | 11/1974 | Kerr | 29/598 |
| 5,058,256 A | * | 10/1991 | Taylor et al. | 29/260 |
| 5,811,908 A | * | 9/1998 | Iwata et al. | 310/261 |
| 6,023,828 A | * | 2/2000 | Iwata et al. | 29/259 |

* cited by examiner

Primary Examiner—Karl Tamai
(74) Attorney, Agent, or Firm—Michael D. Bednarek; Shaw Pittman LLP

(57) ABSTRACT

By inserting a male screw for fixing a ratchet claw into a nut placed on an insert core and the like to prevent rotation, it is possible to eliminate additional screw processing on the insert core, to increase magnetic resistance between a magnet and the insert core provided with the former, to concentrate irradiation of magnetic flux from the second magnet pole toward outside and to fix the magnet and the second magnet pole onto the insert core with screws. Further, by tapering an axial hole of the rotor, it is possible to easily and accurately attach the insert core or the rotor to a crankshaft. Furthermore, by inserting a removal parts of a removal tool into a perforation hole of the rotor, it is possible to realize quick and simple removal of the rotor from the crankshaft.

2 Claims, 20 Drawing Sheets

MAGNETO ELECTRIC GENERATOR ROTOR AND AN IMPLEMENT FOR REMOVING THIS ROTOR

This is a divisional application of patent application Ser. No. 08/882,955 filed Jan. 26, 1991 now issued as U.S. Pat. No. 6,023,828, which is a divisional application of patent application Ser. No. 08/641,647 filed May 1, 1996 now issued as U.S. Pat. No. 5,811,908.

BACKGROUND OF THE INVENTION

1. Field of the Invention

This invention relates to a magneto electric generator rotor used in an internal combustion engine spark plug and an implement for removing this rotor.

2. Explanation of Prior Art

FIGS. 45 and 46 show a broken down section of a small size engine used in a conventional operating machine In said figures numeral I is a small size engine, 1 is a cylinder for said engine 1, and 13 is a connecting rod supporting a piston that moves in this cylinder 12 Also, 14 is a crankshaft for eccentric driving the end of said con rod 13, and 15 is a nut to fix rotor B attached to the end of this crankshaft 14.

One side of said rotor B that is on the opposite side of an axial hole part through which the crankshaft 14 is inserted through secures a magnet 2 and forms a pole piece part P together with a magnetic pole 3, while the other side is composed of an insert core 26 of a ferromagnetic material that becomes counter weight part 4. Further, a cooling fan and the like is installed to this insert core 26 to form one body.

Numeral 6 is a non-magnetic material layer such as a synthetic resin layer formed in a discoidal shape so as to cover said insert core 26.

On one hand 7 is a ratchet claw which is supported in a freely revolving manner to an axle part 8 having a hole 8a as a cylinder part. Also, as shown in FIG. 46, a male screw 10 is inserted through this axle part 8, and the tip of this male screw 10 is screwed into and fixed to female screw 27 which has been formed beforehand in said insert core 26.

Numeral 9 is a ratchet spring of which one end is fixed to said axle part S, and the other end is fixed to said ratchet claw 7 and this gives a rotating force in one direction to the ratchet claw 7.

Also, a reel axle 29 is provided in one body so as to project into an operating machine frame 28 opposite to said rotor B. A reel 16 having continuously wound thereon a rope 17 is supported on this reel axle 29 in a freely rotating manner. On to this reel 16 provided with an engagement part 30 which catches said ratchet claw 7 and gives a rotating force to the reel 16.

A spiral spring 18 is installed in the periphery of said reel axle 29 to apply to said reel 16 a rotating force around this reel axle 29. 31 is a washer fixed to the end of the reel axle 29 by a screw 32 and serves as a protector to prevent the axle hole of the reel 16 from coming off of the reel axle 29. Moreover, the reel axle 29, the reel 16, the rope 17, the spiral spring 18. The engagement part 30, the ratchet claw 7 and the like form a. recoil starter.

Also, 19 is a coil unit formed a power generating coil, ignition coil, ignition control circuit and the like in one body with thermosetting or thermoplastic synthetic resin and is fixed to said cylinder 12 side.

20 is a plug cap connected to said coil unit 19 through a cable 33. This plug cap 90 is connected to a plug 21 next to the cylinder 12. 28 is the operating machine frame housing an engine.

In a small size engine made of such a construction, the reel 16 rotates by manually pulling the rope 17 wound on this reel 16, and the engagement part 30 installed on said reel 16 catches on the ratchet claw 7 on rotor B which has a magnet 2 buried in the insert core 26, and rotates rotor B.

In this way, because said rotor B is attached to the crankshaft 14 of the engine 1, the crankshaft 14 is driven to rotate by said rotor B and the engine 1 is cranked up.

On one hand, at that time the magnetic flux of the magnet 2 attached to said rotor B interlinks with the coil unit 19 having an ignition control circuit fixed to the cylinder 12 side of said engine 1. Said coil} unit 16 will thus generate a power output and this power output will be supplied to the ignition plug 2 through the cable 3q and the plug cap 20, and by this, the ignition plug 21 will generate a spark, ignite the gas mixture in the cylinder 12, and start up the engine 1.

Further, the fixing of the ratchet claw 7 described previously is done by screwing in the axle part 8 supporting it in a ratable manner to the insert core 26 of the male screw 10. For this reason the female screw 27 conforming to the male screw 10 is machine tooled as aforementioned in the said rotor B.

On one hand, the rotor shown in FIGS. 47 and 48 has been proposed in the past as a rotor used in a magnetic power generating machine such as the one described above. This rotor B I is a rotor having a hole piece part 44 with a magnet 42 on one side and an insert core 41 as a counter weight part 45 on the opposite side of an axial hole part 43 buried as an insert form within a synthetic resin (not shown). This rotor B1 is described in, for example Japanese Utility Model Publication 1993-10526.

In this conventional rotor B I, the insert core 41 has been made into an integrated unit with a rivet 47 riveting together layers of multiple magnetic plates in multiple locations, and said axial hole part 43 is a straight hole with the diameter being equal in the direction of the axle.

Also, of the 3 magnetic poles, 46, 46a and 46b forming the pole piece 44, said magnet 42 is inserted in an open hole 49 formed in the center magnetic pole 46, and both ends of the magnet protrude outward towards the axial fringe of each magnet pole 46, 46a and 46b.

In such insert core 41, the pole piece part 44 and the counter weight part 45 are formed in one body. and because there is no need for assembly work and machine tooling after die casting the advantage of a relatively low cost is achieved.

On one hand, in the past, when removing the rotor of a magnetic power generator from the crankshaft 14 of an engine such as shown in FIG. 45, a pulley removing tool is used to remove the pulley attached to the rotary axle.

FIG. 49 shows such a conventional pulley removing tool and a rotor B2 of a magnetic power generator removed therewith. In said drawing, 14 is the engine crankshaft, and this crankshaft 14 is provided with an axial hole 43 for rotor B2 having a magnet and counter weight and the like, and made in a virtually circular form with a non-magnetic material.

Also, said rotor B2 is fixed to the crankshaft 14, so as not to come off freely, with a nut 15 screwed on a male screw part 48 formed on the crankshaft 14 end Moreover, F is a multiple bladed cooling fan installed along the circuit direction of one side of the rotor B2.

On one hand 50 is a bolt attachment part on which a bolt 51 is screwed on at the center part and to both ends are connected arms 52 and 53 through axle supports 54 and 55, and a disengagement claw 53a is installed on the tip of the arm 53.

With this pulley removing tool, first the disengagement claw 53a of each of said arm 53 ends is disengaged at the inner surface of the outer circuit part of the rotor B2 that is pressed against the crankshaft 14 and the tip of said bolt 15 is pressed against the tip of the crankshaft 14.

Further, the nut 15 is removed from the male screw part 48 before and after such operation, then said bolt 51 is screwed on the attachment part 50. With this, the arms 52 and 53 will be subjected to an axial directed torque due to the screwing on power and change the position of the supporting axles 54 and 55 to the center, and the rotor B2, which was being held by the disengaging claw 53a, is removed in the axial direction from the crankshaft 14.

FIG. 50 shows a conventional rotor removal tool and a rotor B1 of a magnetic power generator that is removed with said tool. In the drawing 56 multiple screw holes provided on the rotor B2 so as to pass through both sides of said rotor.

Also, 57 is a male screw, whose tip can be screwed into the screw hole 56. Said male screw 57 is screwed into a through hold 59 provided in a plate 58 and the male screw 57 is prevented from pass in through by a screw head 57a.

On to said plate 58, a bolt 51 is screwed into its center part and it is possible for the tip of the bolt to hit the tip of said crankshaft 14.

According to this removal tool, the tip of the male screw 57 is screwed into said screw hole 56 in certain depth then said bolt 51 is screwed into the plate 58 until the tip of the bolt 51 hits the end of the crankshaft 14.

Then, while keeping said plate 58 in a position that is parallel to the rotor B2, said bolt 51 is screwed in. By doing this, the power to remove the rotor B2 from the crankshaft 14 is provided to the rotor through the male screw 57 in the plate 58. For this reason the rotor B2 can be smoothly removed from the crankshaft 14.

However, with a rotor B of a conventional magnetic power generator such as that shown in FIGS. 45 and 46 even at present when the nonprocessing of the rotor B has become advanced, but only the processing of the screw (female screw) 27, which is used for fixing said ratchet claw 7 cannot be eliminated For this reason a reduction in cost could not be achieved.

Also, with a rotor using an insert core of layered magnetic plates and formed into an approximately circular shape with plastic, the processing of said screw for use in attaching the ratchet could not be carried out without performing special work such as inserting aluminum parts.

Also, because the axial hole part 43 is a straight hole in the rotor B I of the conventional magnetic power generator shown in FIGS. 47 and 48, when assembling said axial hole part 43 to the crankshaft 14 of the internal combustion engine, it is difficult to provide sufficient cohesive strength to both parts. Also, in order to provide sufficient cohesive strength to both parts, it is necessary to use a separately prepared cohesion aid tool.

Also, in order to provide sufficient cohesion strength to said axial hole part 43 and said rotor B 1, said axial hole part 43 can be made into a tapered hole and tighten the bond between both parts. However, in said layered insert core 41, the tapered hole will be terraced with each layer of the plate. For this reason the contact with said crankshaft 14 will become shaky and the cohesion between both parts will be imperfect.

Further, because both ends of the magnet 42 protruded out (out of the thickness) in the axial fringe direction Z of each magnetic pole 46, the magnetic flux of said magnet 42 could not be sufficiently concentrated on magnetic pole 46. That is a part of the magnetic flux would leak outside the magnetic pole 46 and will not reach the power generating coil and ignition coil. For this reason, the power generating capacity for ignition and the like cannot be sufficiently generated.

Also, when using a layered insert core 41 in an attempt to sufficiently bring out the capacity of said magnet 42, it will be necessary to increase the thickness of the layers which results in increase of weight of whole rotor. Also, in case the layered thickness is altered partially, the increase of initial cost accompanying the increased cost for press molds and the increase in the process steps and costs cannot be avoided.

Further, it has been proposed that an insert core 41 be formed with a magnetic sintered alloy and said magnet introduced between the insert core 41 and the magnetic pole on the support provided thereon. However, in this case it will be necessary to make the support fairly thick due to the conditions for forming.

For this reason, this support will invite shortages in the magnetic circuit and the magnetic flux generation rate in said magnetic pole will deteriorate, and the power generating capacity in said power generating coil and the like will also become inadequate.

Further, in the removal method for rotor B2 shown in FIG. 49, it will be necessary to disengage the disengaging claw 53 along the outer surface of the rotor B2. At present, when miniaturization of the magnetic power generator and engine is being aimed at, it is difficult to keep the space required for such a disengagement claw 53 on the peripheral of said rotor B2 and as a result such a pulley removal tool cannot be practically used.

Also, in the removal method shown in FIG. 50, it is necessary to apply an additional process of a screw hole 3 S for the rotor obtained by molding to the latter steps of processing, and the non-processing of the rotor B2 cannot be realized which will invite a decrease in production efficiency and an increase in cost.

SUMMARY OF THE INVENTION

The present invention was made based on said situation, and the object is to provide an inexpensive magnetic power generator rotor on which a claw can be easily and reliably attached without any special workmanship nor screw processing.

Also, this invention has the object of enabling an adequate concentration of said magnetic flux of a magnet to the magnetic pole by increasing the magnetic resistance of the magnetic circuit connecting the magnetic pole to the insert core, thereby obtaining a magnetic power generator rotor that can improve the power generating capacity in the power generating coil and the like.

Also, this invention has the object of obtaining a magnetic power generator rotor that can more adequately concentrate the magnetic flux of a magnet on a specific magnetic pole.

Also, this invention has the object of obtaining a magnetic power generator rotor that can fix the magnet and magnetic pole to the insert core reliably and inexpensively without subjecting the insert core to any machine tooling at all.

Also, this invention has the object of obtaining a magnetic power generator rotor that can reliably prevent a magnet from shifting out of place on the target surface when assembling on an insert core.

Also, this invention has the object of obtaining a magnetic power generator rotor that enables the easy implementation of the operation for tightly fastening with a screw and nut a magnet and magnetic pole to an insert core.

Also, this invention has the object of obtaining a magnetic power generator that enables the easy installation and fixture of an insert core of sintered alloy to a crankshaft.

Also, this invention has the object of obtaining a magnetic power generator rotor that can reliably implement a stoppage of the rotation of a axial hole part on a crankshaft.

This invention has the object of obtaining a magnetic power generator rotor that enables removal from a crankshaft very easily and reliably with a removal tool, without subjecting to an additional process such as providing a screw hole or the like.

Also, this invention has the object of obtaining a magnetic power generator rotor removal tool that enables the removal of a rotor from a crankshaft in a simple operation and manipulation, even without having sufficient work space in the periphery of the rotor.

Also this invention has the object of obtaining a magnetic power generator rotor removal tool that enables the removal of a rotor from a crankshaft with a simple disengaging operation for a removal perforation of a removal part.

To achieve aforementioned objects, in the magnetic power generator rotor of this invention, a nut rotation blocking hole and an insert hole for said male screw are provided on a part of the insert core to which a rotation ratchet claw is fixed, thereby there is no need for a screw thread processing on this insert core itself latter, and said ratchet claw can be fixed to the insert core through an axial part supporting in freely rotating manner said ratchet claw by merely fastening said nut to said rotation blocking hole and screwing the tip of the male screw, which had been passed through said perforation.

In addition, by forming the axial part supporting said ratchet claw in a manner enabling rotation in one body with said insert core during the formation of said insert core, it is not necessary to use a cylindrical part forming said axial part as a part and therefore lowering of costs can be planned.

Also, the magnetic power generator rotor of this invention is provided at the pole piece part with a first pair of magnetic poles formed in one body on the insert core and a second pair of magnetic pole made from a magnetic plate installed between said first magnetic poles and held the magnet between said insert core, so that the magnetic flux density that is radiated outside through the second magnetic poles is increased and the concentration of the magnetic field to such as the power generating coil and the like is made possible.

Also, the magnetic power generator rotor of this invention introduces the second magnetic pole through a non-magnetic part between the first magnetic poles and a magnet is contained between the said insert core with the second magnetic poles, and thus the concentration of the magnetic flux of the electro-magnet at the second magnet poles is made possible.

Also, the magnetic power generator rotor of this invention makes possible the concentration of the magnetic flux of a magnet at the second magnetic poles, that is in a condition of being magnetically insulated from the first magnetic poles, by screwing said second magnetic pole on to the insert core between the first magnetic poles with a non-magnetic screw through a magnet.

Also, the magnetic power generator rotor of this invention makes it possible to easily fix said magnet and second magnet pole to said insert core by tightening said screw from the outside of the second magnetic pole, by joining the magnet and the second magnetic pole to the screw and nut to be fixed at the indented hole pan of the opening on the side of the insert core.

Also, the magnetic power generator rotor of this invention makes it possible to prevent the magnet from shifting its position to the axial and circular directions of the rotor and fixing the magnet in its proper position between first two magnetic poles by providing shift-protecting ribs on the target surface of the insert core magnet so as to cover at least the 3 sides of the bottom end of the magnet.

Also, the magnetic power generator rotor of this invention simplifies the screwing in operation required for the screws and nuts by making the indented hole part for the nuts the shape and size of the rotation block for the nut and screwing said screw into the nut from the outside of the second magnetic pole.

Also, the magnetic power generator rotor of this invention makes it possible to utilize their shapes and structure capable of reducing the mass by molding the insert core with a sintered magnetic alloy, to maximize the concentration of the magnetic flux of the magnet at the magnetic poles by equalizing the length of the axial fringe direction of the magnet and the magnetic poles, and to ensure a firm contact of the axial hole part with the crankshaft by making the axial hole part a tapered hole.

Also, in the magnetic power generator rotor according to this invention, the forming of the key groove against the axial hole part can be simplified because the insert core can be obtained by molding of the sintered alloy, and therefore using this key groove has made it possible to reliably block the rotation of the rotor having said insert core against the crankshaft.

Also, in the magnetic power generator rotor according to this invention, the forming of the key protuberant for the axial hole part can be simplified because the insert core can be molded with the sintered alloy, and using this key protuberant has made it possible to reliably block the rotation of the rotor having said insert core against the crankshaft.

Also, with the magnetic power generator rotor of this invention a straight hole as the axial hole part can be formed simultaneously with its inside surface in a smooth condition at the time of forming the insert core, and it has been made possible to avoid such bothersome post processing as surface grinding of the inside of the axial hole part as done in the prior art.

Also, with the magnetic power generator rotor of this invention the extraction part of a removal tool for removing the rotary body from the crankshaft is being inserted in the rotor and a multiple of perforations for removal purpose whose peripheral part is engaged with this extraction part is being provided on the rotor; and therefore it is possible to remove the rotor from the crankshaft by insertion of said removal tool into the perforations followed by the operation of the peripheral engagement and further by the extraction operation of the removal tool.

Also, the magnetic power generator rotor removal tool according to this invention is provided with a plate positioned opposite to the magnetic power generator rotor having an axial hole in the crankshaft of the engine, a screw part screwed into the center part of said plate so as to pass through the plate with the tip part touching the end of said crankshaft, and a multiple of extraction parts positioned so as to stop one end part from passing through said plate; therein an engagement part inserted into a multiple of perforations for removal provided in said rotor and engaged with the peripheral part of said perforations is formed at the other end of said extraction part. Therefore, by inserting the end part of said extraction part into the perforations for removing the rotor and carrying out the rotation operation, the engagement part of the extraction part hitches on to the peripheral of the perforations for removal and further applies a direct torque generated by the screwing-in operation of the part to the rotor and crankshaft through said engagement part so that the rotor can be removed from the crankshaft.

Also, the magnetic power generator rotor removal tool of this invention is provided at the end of the removal part with an engagement protuberant that can be engaged in the peripheral of the perforations for removing the rotor with the rotation operation. Therefore, by pulling up said extraction part in this engaged condition by screwing in the screw part through the plate, the extraction of the rotor from the crankshaft is made possible.

Also, the magnetic power generator rotor removal tool of this invention is provided with an engagement protuberant part at the tip of the extraction part that can be engaged in the area of the perforations for removing the rotor by a linear motion operation. Therefore, by pulling up said extraction part in this engaged condition by screwing in the screw part through the plate, the extraction of the rotor from the crankshaft is made possible.

Also, the magnetic power generator rotor removal tool of this invention is provided with an engagement protuberant part at the tip of the extraction part that can be engaged in the area of the perforation for removing the rotor by the rotation operation of a plate provided with an extraction part. Therefore by pulling up said extraction part in this engaged condition by screwing in the screw part through the plate, the extraction of the rotor from the crankshaft is made possible.

DETAILED DESCRIPTION OF THE INVENTION

Figure 1:
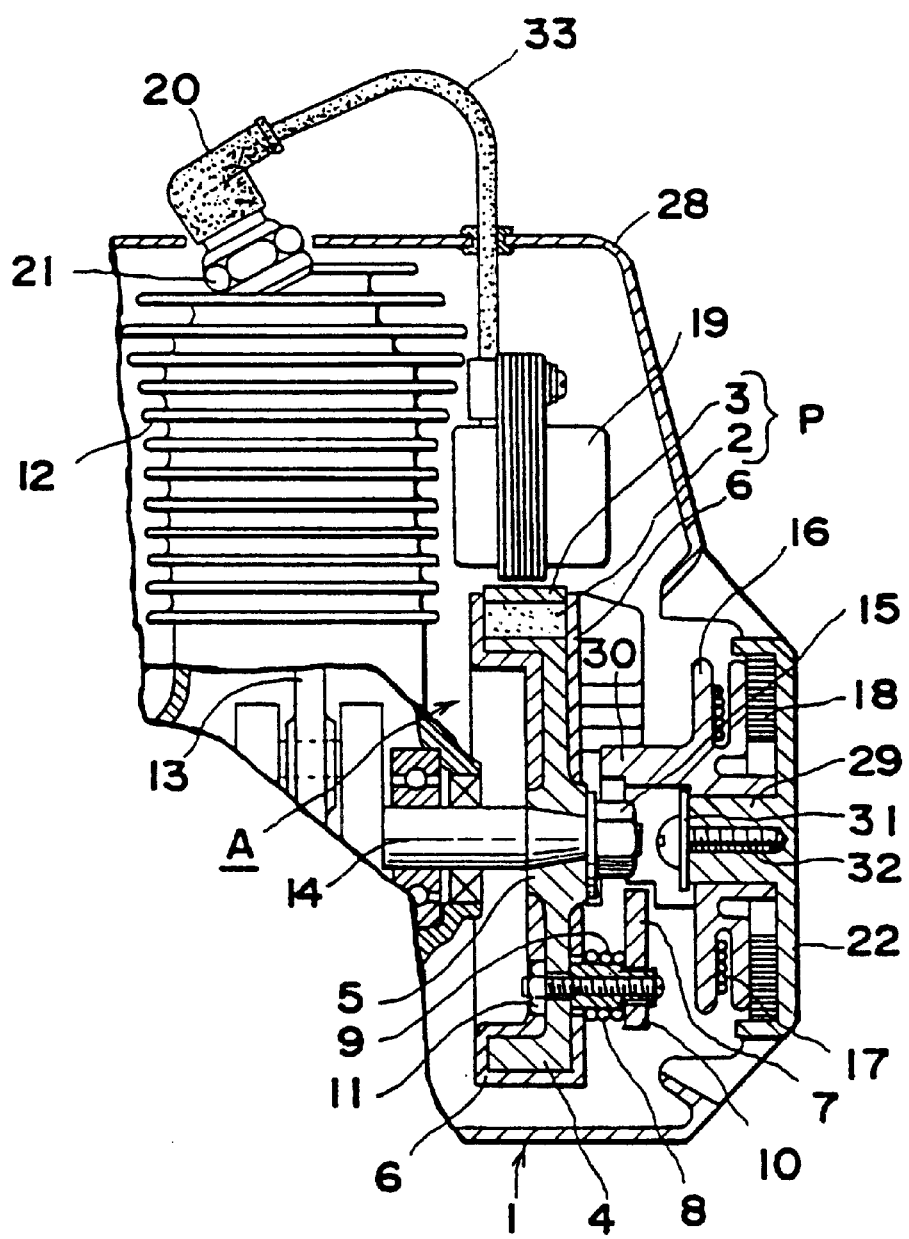
FIG. 1 is a sectional drawing showing a partly broken down small size engine having a magnetic power generator rotor in accordance with the configuration for implementing this invention.
Figure 2:
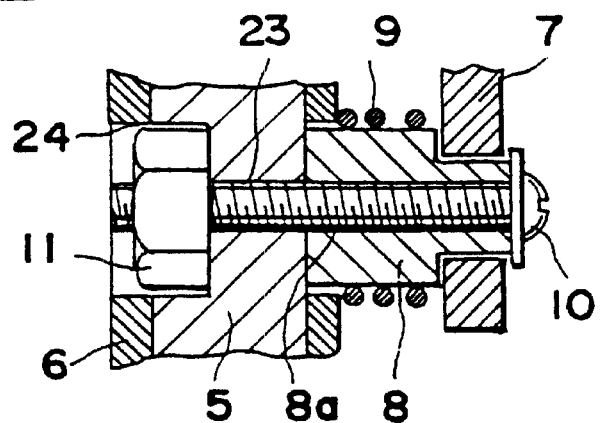
FIG. 2 is a sectional drawing showing an enlargement of the principal parts of the rotor in FIG. 1.
Figure 45:
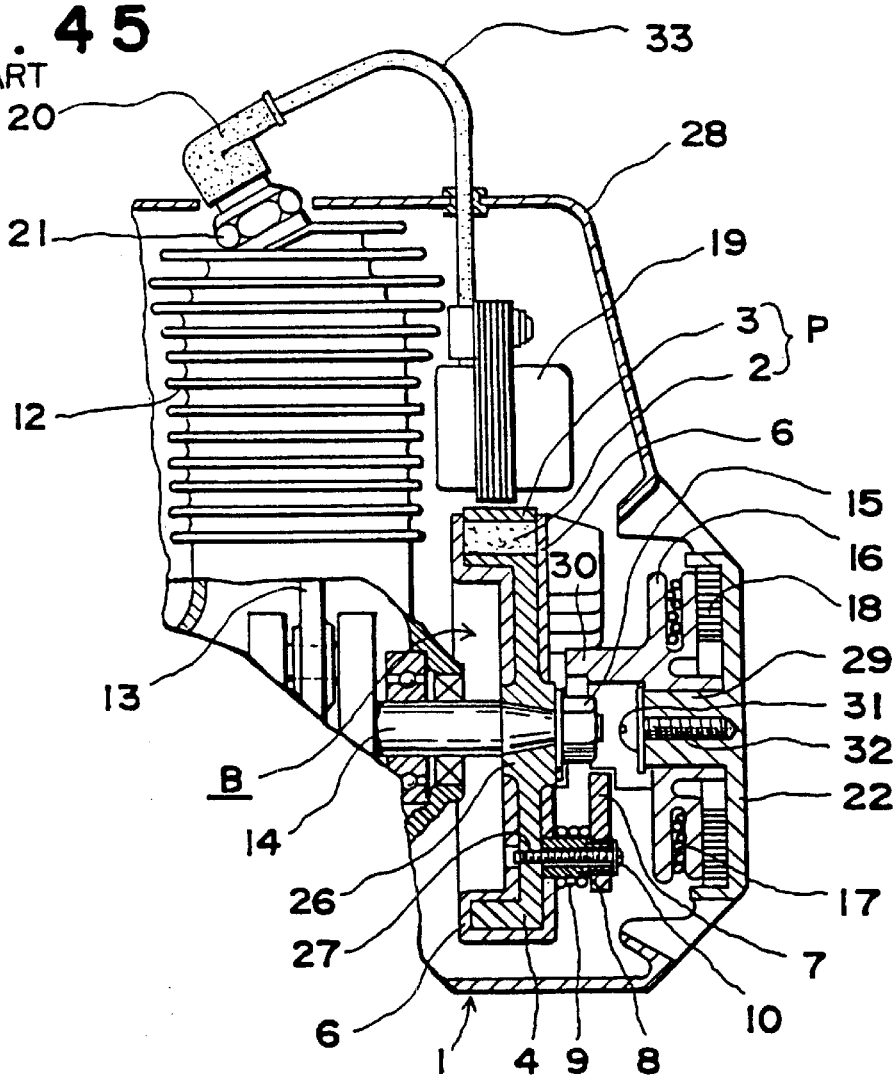
FIG. 45 is a sectional view showing a partially broken down conventional small size engine.
Figure 46:
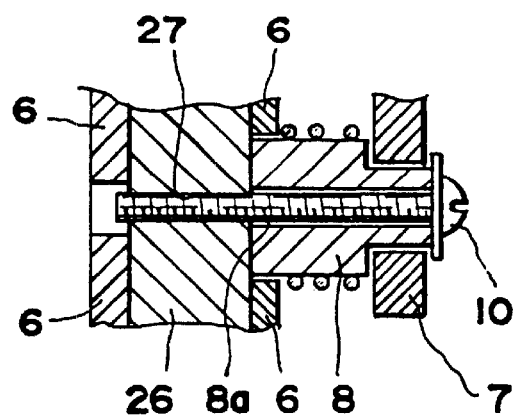
FIG. 46 is a sectional view showing an enlargement of part of the rotor in FIG. 45.
Figure 47:
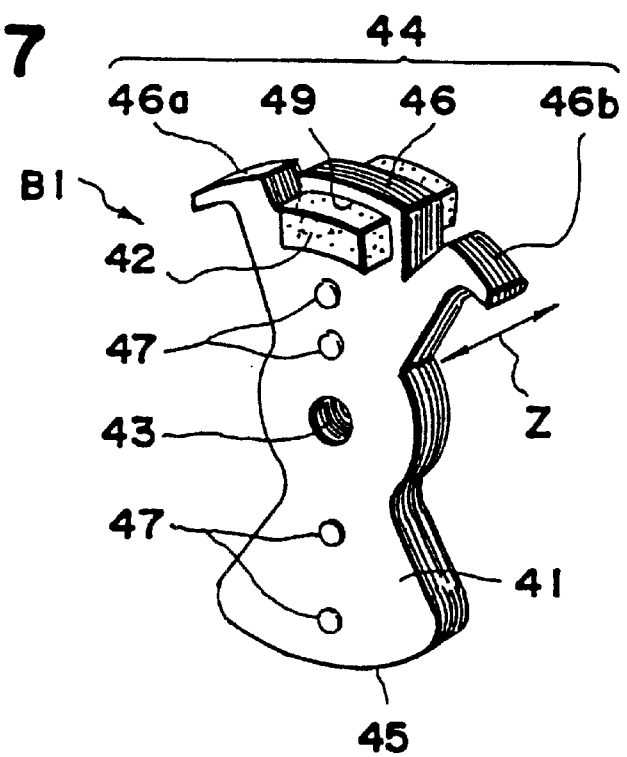
FIG. 47 is a dismantle view showing an insert core in a conventional magnetic power generator rotor.
Figure 48:
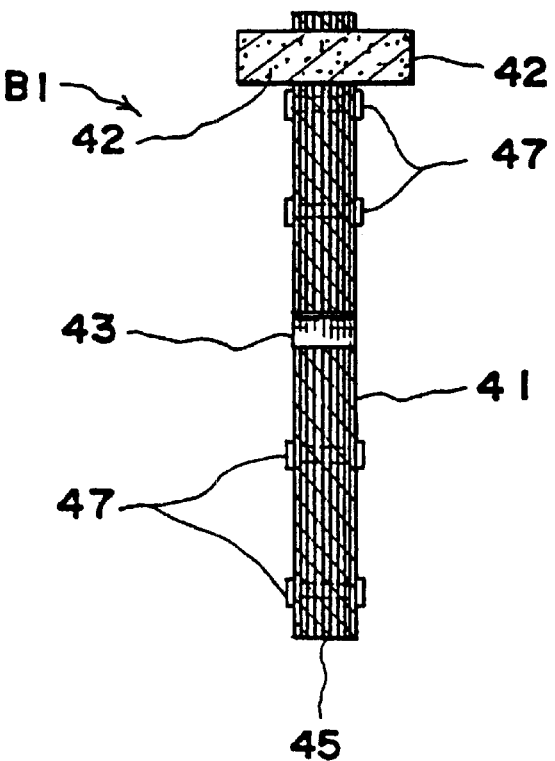
FIG. 48 is a longitudinal section view of the insert core shown in FIG. 47.
Figure 49:
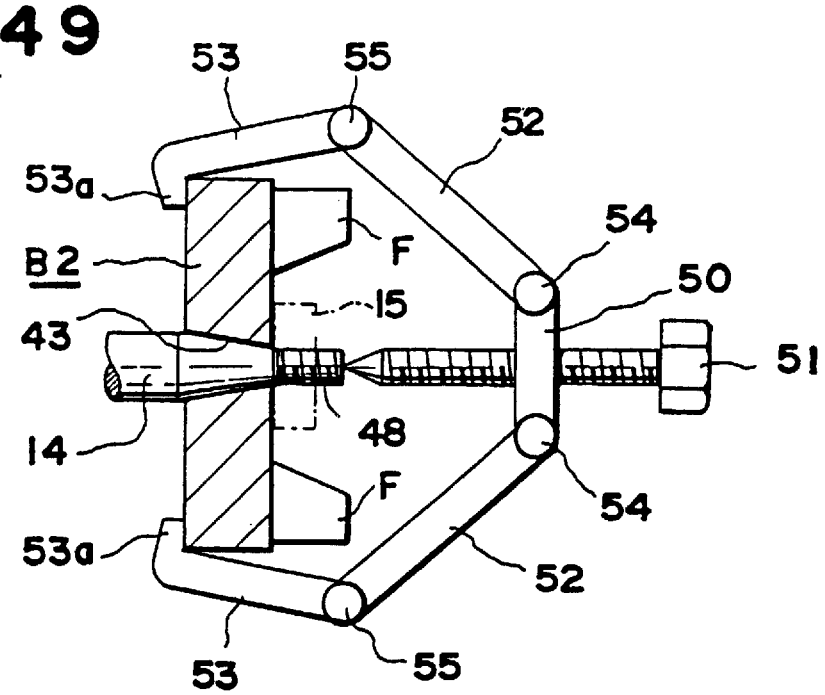
FIG. 49 is a side view showing a conventional pulley removal tool.
Figure 50:
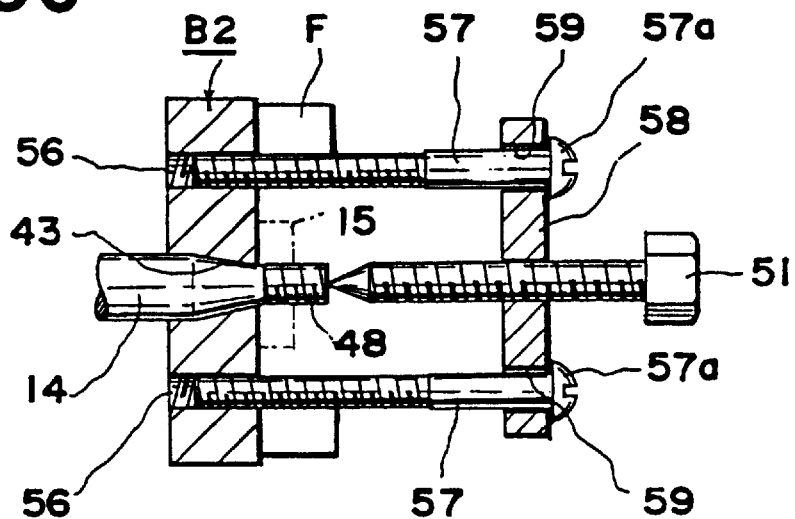
FIG. 50 is a side view showing a conventional rotor removal tool.

In FIGS. 1 and 2, identical symbols indicated previously are affixed to the parts identical with the past examples in FIGS. 45 and 46.

In rotor A of the magnetic power generator of the configuration according to this implementation, a ratchet claw 7 is provided as shown in FIG. 2 to an axial part 8 having a perforation 8a as it cylindrical part. Moreover, 10 is a mate screw pushed through a perforation 23 which is formed by a perforation 8a of said axial part 8 and an insert core 5.

Figure 3:
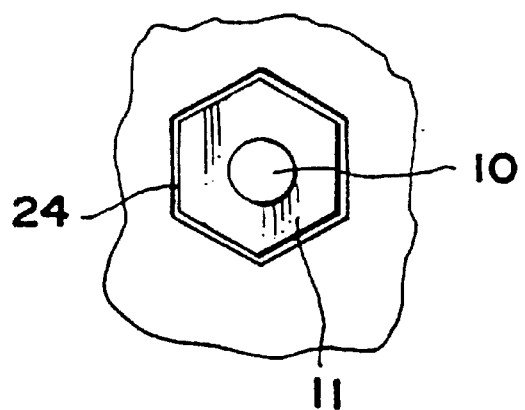
FIG. 3 is a left side view showing the principal parts of the rotor in FIG. 9.

Furthermore, 11 is a nut which is screwed on the end of said male screw 10 and secures said axial part 8 to said insert core S. Moreover, a nut 11 is located in a rotation blocking hole 24 formed in said insert core 5, and blocks rotation despite the screwing in operation of said male screw 10. FIG. 3 shows a hexagonal concave shape slightly larger than said nut 11.

Also, said rotation blocking hole 24 can be formed with a non magnetic layer 6 such as synthetic resin and aluminum wit lout providing an insert core 5.

Consequently, in the rotor of a small size engine with such a construction, in case said ratchet claw 7 is installed on the insert core 5, first the ratchet claw 7 is attached to said axial part 8 in a freely rotating manner, then the male screw 10 is screwed through the axial part 8.

Next, after inserting said male screw 10 into the perforation 23 which has been pre-formed in the insert core 5, the nut 11 is screwed on to the end of said male screw 10 which is protruding out from the insert core 5.

Said screwing on action can be easily and quickly effected by screwing on the male screw 10 to the nut 11, which has been installed in the rotation blocking hole 24, through the axial part 8.

Therefore, according to the configuration of this embodiment, there is no need to purposely carry out the screw thread process for the male screw in order to screw the male screw 10 on to the insert core 5, and said ratchet claw 7 can be easily secured.

Further according to the configuration of this embodiment, the shape of said rotation blocking hole 24 is shown as being hexagonal, but it can be any shape if the rotation blocking effect can be achieved when the nut 11 is embedded.

Figure 4:
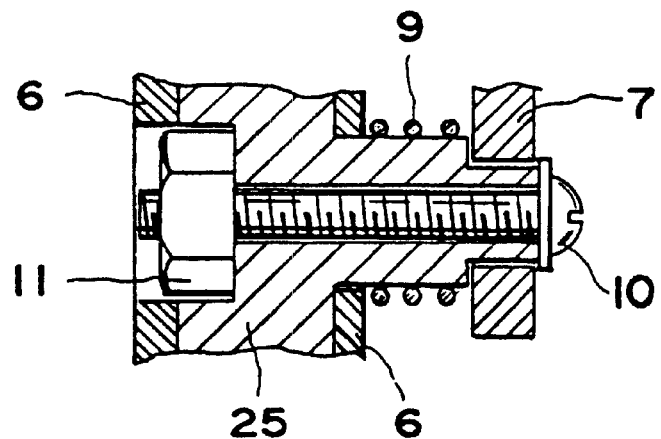
FIG. 4 is a sectional drawing showing an enlargement of the principal parts of a magnetic power generator rotor according to another configuration for implementing this invention.

Next, FIG. 4 is a partial sectional view showing another configuration for implementing this invention, and the difference with the above described embodiment is in the point that the axial part 8 supporting the ratchet claw 7 in a free rotating manner has been formed into one unit with the insert core 5 when forming the latter. In all other respects it is identical with the embodiment described above, so a duplication of explanation will be omitted.

With such a construction, the need to prepare said axial part 8 as a separate part will disappear, and it will be possible to plan a cost reduction by eliminating the number of parts used, and an improvement In the efficiency of assembly work.

Further, in the configuration for implementation shown in FIGS. 1 through 4, an insert core 5 formed by using a tempered bonding metal of a magnetic material was shown, but a layered magnetic plate would also have the same effect as that described previously.

Moreover, in said configuration for implementation, the case where an insert core 5 is covered with a synthetic resin layer that is of a non-magnetic material and formed into a disc shape was described, however, as long as it is a non-magnetic material, anything can be used. For example, it can be covered with an aluminum die cast using aluminum.

Furthermore, said configuration for implementation explained the case where an insert core 5 was used with the axial hole between a pole piece part P on one side and a counter weight part 4 on the other side, however it goes without saying that the present invention can also be applied when the pole piece part P and the counter weight part 4 are separated.

Figure 5:
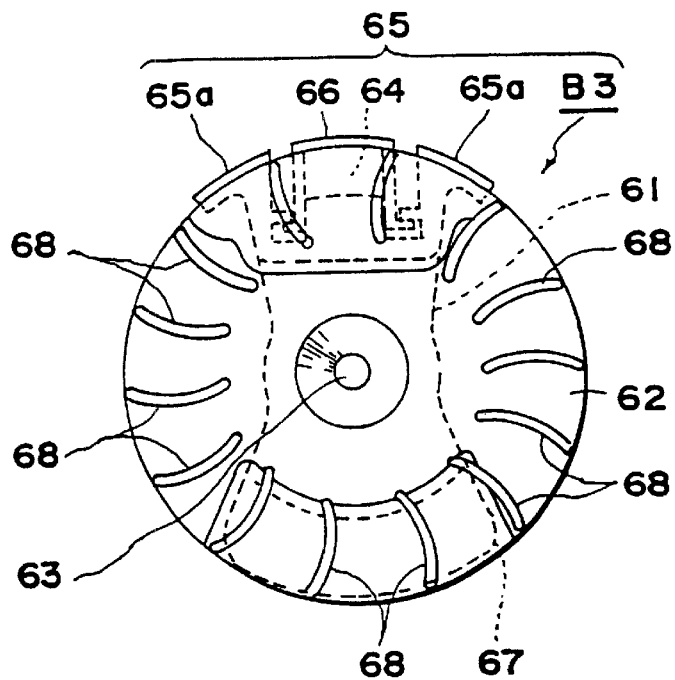
FIG. 5 is a front view showing a magnetic power generator rotor according to another configuration for implementing this invention.

FIG. 5 is a front view showing a magnetic power generator rotor B3 according to another configuration for implementing this invention, and in said drawing 61 is an insert core made from a magnetic sintered alloy forming an approximately I-shape as a whole, and 62 is a non-magnetic material layer such as a synthetic resin layer and aluminum die cast layer formed by ejection to cover the insert core 1.

Figure 6:
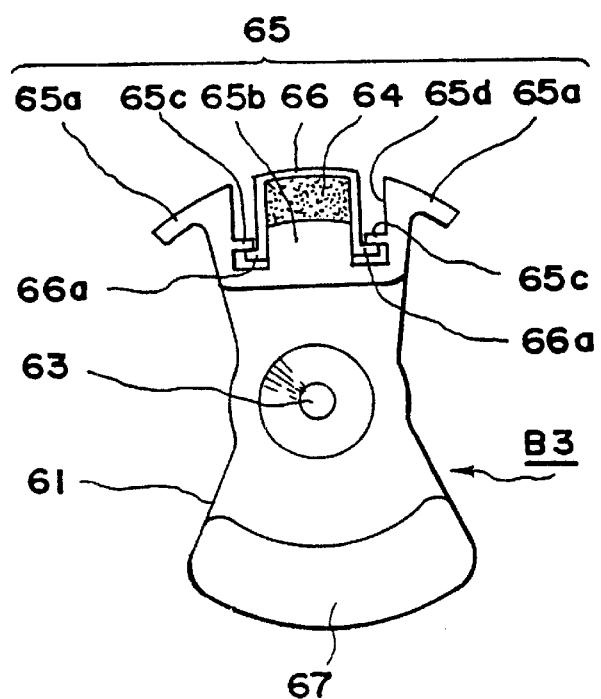
FIG. 6 is a front view showing the insert core in FIG. 5.

Also, with said insert core 61, an axial hole part 63 is between a pole piece part 65, with a magnet 64 on one side, facing a counter weight part 67 on the other side The said pole piece 65, as shown in FIG. 6, has a pair of approximately L-shape magnetic poles 65a projecting at one end of an insert core 61, a concave part 65b for attachment indented between said magnetic poles 65a, a pair of engagement blocking protuberance 65 projecting from the opposite walls in said concave part 65b for attachment, and a magnetic receptacle part 65d protruding from the bottom part of said concave part 65b for attachment.

Figure 8:
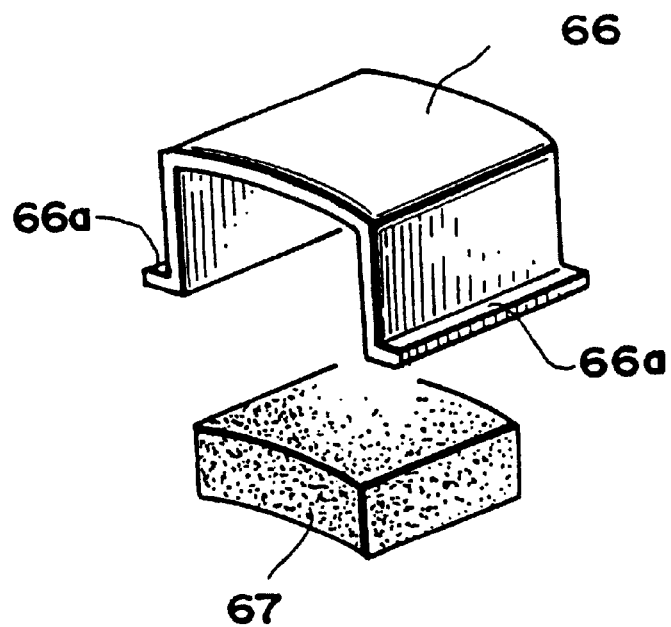
FIG. 8 is a dismantle deal drawing showing an enlargement of the magnetic pole and magnet in FIG. 6.

Also, 66 is a magnetic pole formed in an approximately horseshoe shape by a magnetic material as a whole, and as shown in FIG. 8 at both ends are installed engagement pieces 66a, which can be engaged with said engagement blocking protuberance 65c.

Further, 64 is a magnet and when the engagement piece 66a is engaged with said engagement blocking protuberant 65c, the magnet 64 will be held between the bracket-shaped part of said magnetic pole 66 and the receptacle surface of said magnetic receptacle part 65d.

In short, said magnetic pole 66 is formed independently of insert core 61, and when assembling the rotor it is attached to said insert core 61, and at the point of attachment (separate part) the magnetic resistance of the magnetic circuit will increase.

Furthermore, said magnetic pole 66 and the magnet 64 form one part of said pole piece 65, and the magnet pole 66 comes close to a power generating coil and ignition coil which are not shown in the drawings and functions to generate voltage.

Figure 7:
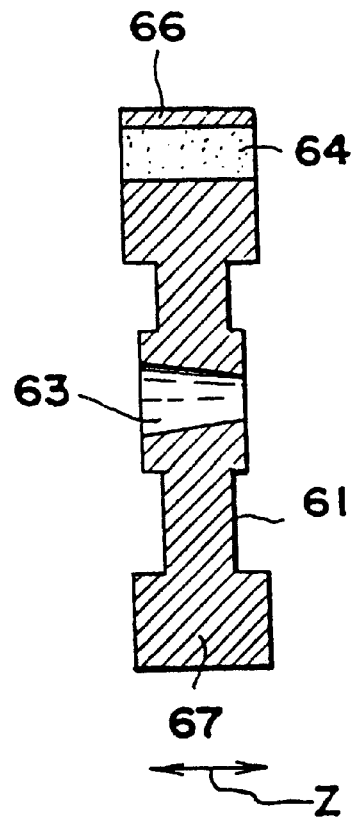
FIG. 7 is a longitudinal section view of the insert core shown in FIG. 6.

An insert core 61 having a pole piece part 65 and a counter weight part 67 as shown in FIGS. 6 and 7, is positioned in a metal mold that is not shown in the drawing and each part excluding the axial hole part 63 is ejection formed, or aluminum die cast formed, and a disc shape rotor coated with a non-magnetic material layer 62 as shown in FIG. 5 is formed.

Also, 68 is a cooling fan formed simultaneously when enjection forming or aluminum die cast forming said synthetic resin and protrudes in an ideal shape to carry out the cooling of the internal combustion engine.

Also, the axial line directional Z length of said magnet 64 is equal with the magnet 65a and 66; therefore, the magnetic flux of the magnet 64 is concentrated in magnetic pole 66 and can affect the ignition coil and power venerating coil, that are not shown in the drawing, with high efficiency.

Also, said counter weight part 67 has the necessary and sufficient weight to match the weight of said pole piece part 65 and is designed to improve the inertial moment of the insert core 61, and is formed in an approximately arc shape as a whole.

The insert core 61 having the axial hole part 63, the pole piece part 65 and the counter weight part 67 is formed by a magnetic piece made from a sintered alloy as one unit using one metal mold as described previously.

Also, said axial hole part 63 is a tapered hole whose inside diameter changes in the direction of the axial fringe as described previously. Because this tapered hole is formed by the metal mold simultaneously when forming said insert core 61, it becomes possible to smoothly finish the inside surface.

For this reason, when installing a rotor B3, having such a tapered hole as the axial hole part 63, under pressure on the crankshaft 14 of the internal combustion engine, a part of the tapered hole will be in tight contact with the outer surface of the crankshaft 14. For this reason said rotor can be accurately attached to is designated position on the crankshaft.

Also, the outer surface part of each of said magnetic poles 65a and 66 is slightly exposed outside of said non-magnetic material layer, and thus is able to efficiently supply the magnetic flux of the magnet 64 to the power generating coil and the ignition coil. Consequently, it is possible to increase the power generating efficiency of each of these coils.

A magnetic power generator rotor B3 with such a construction is attached to the crankshaft 14 of an internal combustion engine and rotates as described above and adequately affects the magnetic flux from the magnetic pole 66 on to the power generating coil and ignition coil positioned in the area of the rotor B3 and generates an induced power of a pulse form in each of these coils.

In this case, said magnetic pole 66 is formed into one unit with the magnet 64 which is installed in the magnetic receptacle part 65d of the insert core 61 by its engagement piece 66a.

For this reason, the magnetic resistance of the magnetic circuit at the part of engagement of this engagement piece 66a and the engagement blocking protuberant 65 that blocks the engagement becomes great. In short, the shortage part of the magnetic circuit can be lowered and virtually all of the magnetic flux generated by the magnet 64 engagement, and thus it is possible for the magnetic flux passing through this magnetic pole 66 to adequately affect said coils. As a result, it is possible to drastically improve the power generating capability of each coil.

Figure 9:
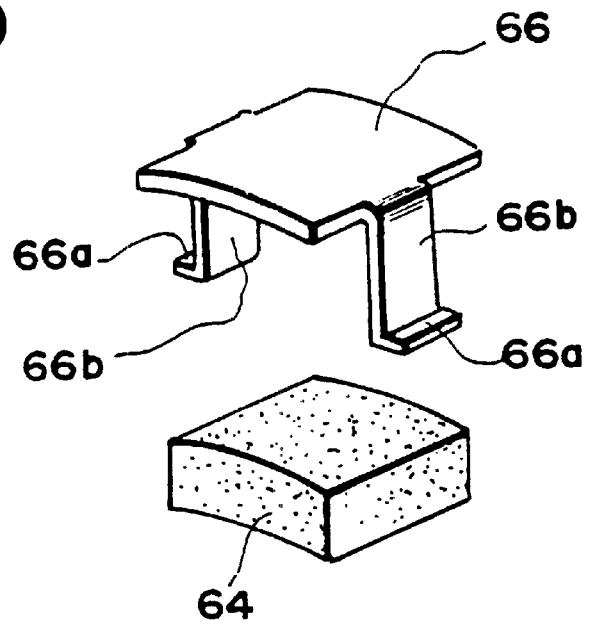
FIG. 9 is a dismantle deal drawing showing an enlargement of another example of the magnetic pole and magnet in FIG. 6.

Moreover, in order to further reduce the shortage part in the magnetic circuit it is also possible to narrowly control the start up piece 66b of the magnetic pole 66 covering the side of said magnet 64 as shown in FIG. 9.

Figure 10:
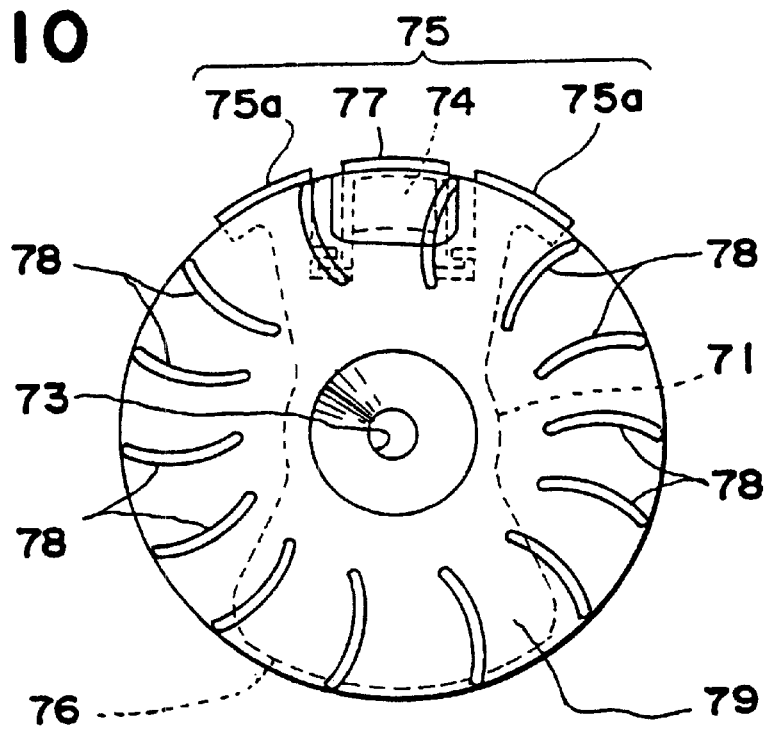
FIG. 10 is a front view showing a magnetic power generator rotor according to another configuration for implementing this invention.
Figure 11:
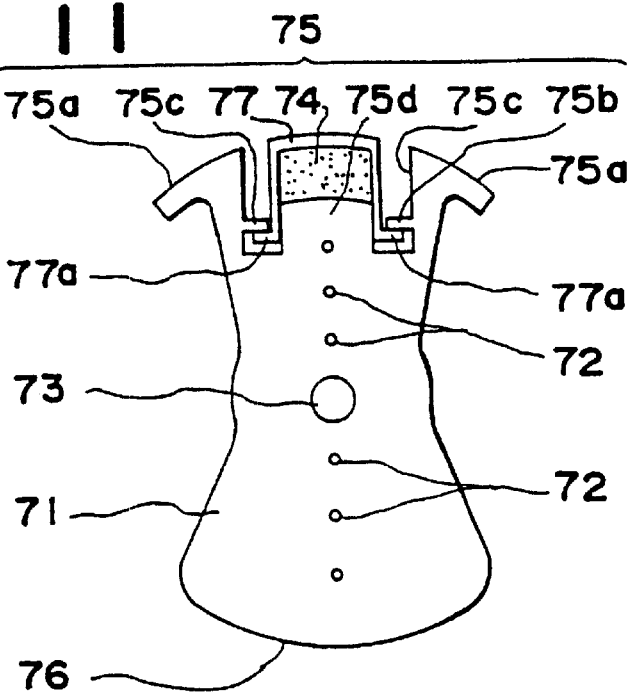
FIG. 11 is a front view showing the insert core in FIG. 10.

FIG. 10 is a rotor showing another configuration for implementing this invention, and the insert core forming this rotor, as shown in FIG. 11, blocks a multiple layered magnetic plate with a rivet 72 and is composed of layers.

Even in this configuration of embodiment, excluding the axial hole part 73, said insert core 71 is formed in a disc shape covered by a non-magnetic layer 79 and the axial hole part 73 is between a pole piece part 75 having a magnet 74 on one side and a counter weight 76 on the opposite side.

Figure 12:
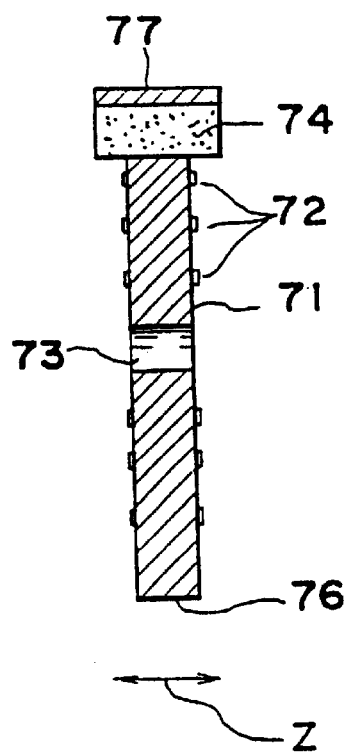
FIG. 12 is a longitudinal section view of the insert core shown in FIG. 11.

Said pole piece part 75 has, as shown in FIGS. 11 and 12, a pair of approximately L shape magnetic poles 75a protruding at one end of an insert core 71, a concave part 75b for attachment indented between each of said magnetic poles 75a, an engagement blocking protuberant 75c projecting from a pair of walls facing each other in said concave part 75b for attachment, and a magnet receptacle part 75d projecting from the bottom of said concave part 75b for attachment.

Also, 77 is a magnetic pole formed in an approximately horseshoe shape by a magnetic plate, and at both ends, as shown in FIG. 7, an engagement piece 77a, which can be engaged with said engagement blocking protuberant 75c, is provided.

74 is said magnet, which is secured between the bracket-shaped part of said magnetic pole 77 and the receptive surface of said magnet receiving part 75d at the time of engaging the engagement piece 77a with said engagement blocking protuberant 75c 78 is a fan used for feeding air, and 79 is a non-magnetic material layer.

Further, said magnetic pole 77 and magnet 74 also comprise a part of said pole piece part 75, and magnetic pole 77 approaches near a power generating coil and an ignition coil which are not shown in the drawing and forms a magnetic circuit for generating voltage.

In this configuration of embodiment, the axial line directional Z length of the magnetic pole 77 and the magnet 74 are equal, and moreover is greater than the thickness of the insert core 71, therefore it is possible for the highly dense flux generated by magnet 74 to adequately affect said power generating coil and the like through magnetic pole 77 having a weak magnetic resistance (the mutual contact area is equal).

Figure 13:
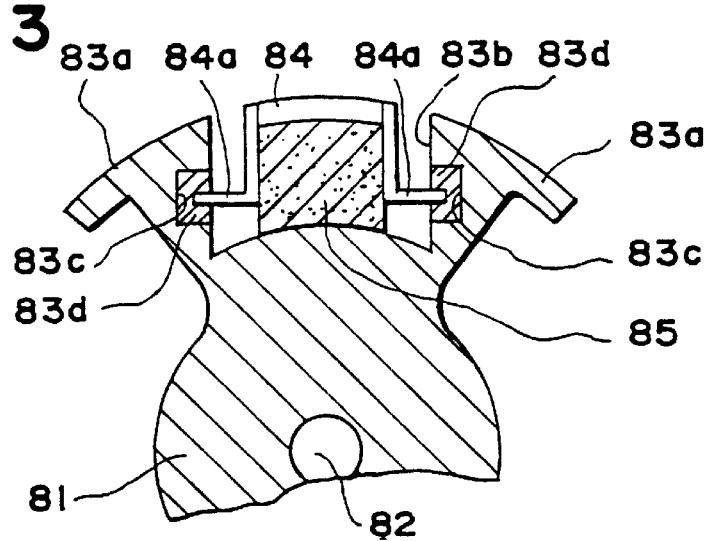
FIG. 13 is a front view showing a partially broken down insert core insert core in a magnetic power generator rotor according to another configuration for implementing this invention.

FIG. 13 shows another configuration for implementing this invention. In said drawing, 81 is an insert core made from sintered alloy of non-magnetic material or a layered magnetic plate. In this insert core 81, 82 is an axial hole part such as a tapered hole or straight hole and the like, 83a is a pair of L shape magnetic poles provided at one end of insert core 81, and 83b is a concave part for attachment formed between each of the magnet poles 83a.

Also, 83a is a cut off part formed on the facing walls of the concave part 83b for attachment, 84 is a horseshoe shape magnetic pole supported by said facing walls 83b in such a manner that the engagement pieces 84a at both ends seem to be biting into the non-magnetic part 83d provided in the cut off part 83a and which is made of magnetic plates.

Also, 85 is a magnet which is held between said magnetic pole 84 and the bottom part of said concave part for attachment 83*b*. Magnetic poles 83*a*, 84 and magnet 85 form the pole piece part.

The insert core 81 comprised thus is identical with each of said configurations for embodiment, and over these are provided a non-magnetic layer by ejection forming of synthetic resin or aluminum die casting to prepare a disc shape rotor.

In this configuration of embodiment, by providing a non-magnetic part 83*d*, such as that described previously between the magnetic pole 84 and the magnetic pole 83*a*, the magnetic resistance at the engagement blocking part (connecting part) becomes very strong.

Consequently, the flow of magnetic flux from the magnetic pole 84 to the magnetic pole 83*a* is reduced. In short, the shortage part of the magnetic circuit becomes small and it becomes possible for much of the flux from magnet 85 to pass through magnetic pole 84 and be adequately concentrated in such as the power generating coil and the like.

Figure 14:
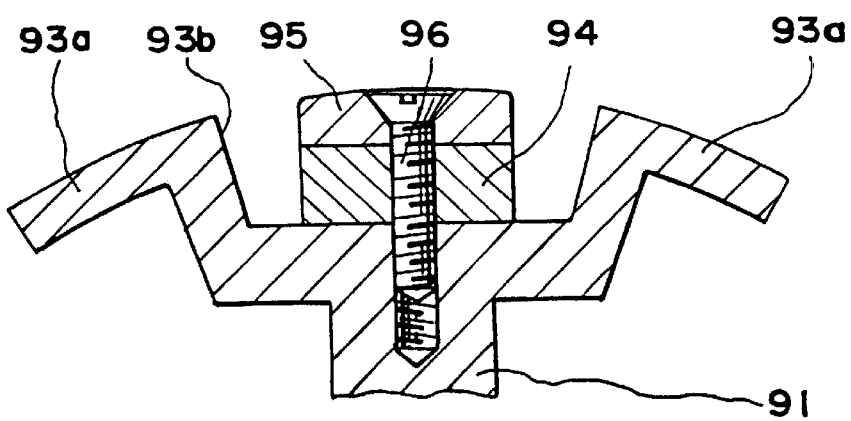
FIG. 14 is a sectional drawing showing a partially broken down insert core in a magnetic power generator rotor according to another configuration for implementing this invention.
Figure 15:
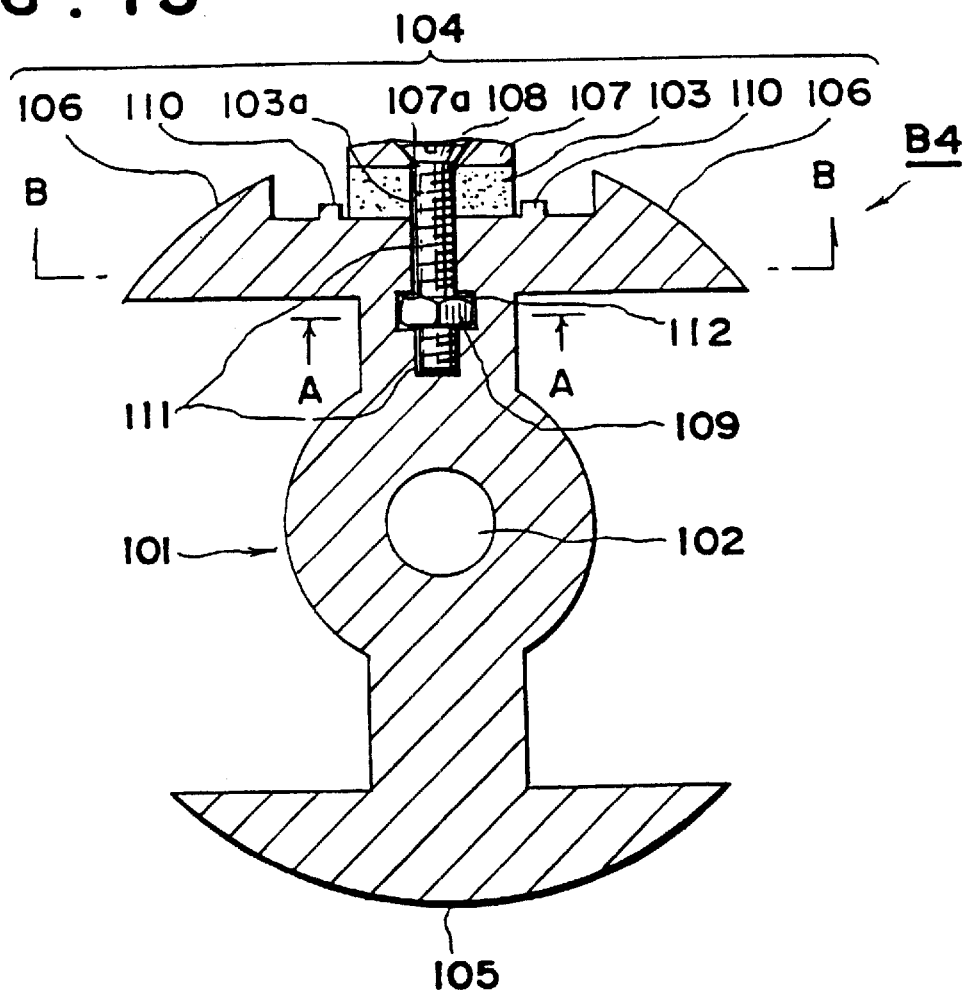
FIG. 15 is a front sectional view showing a magnetic power generator rotor according to another configuration for implementing this invention.

FIG. 14 shows a configuration of another embodiment of this invention. This configuration of embodiment places a magnet 94 and a magnetic pole 95 of about the same size on top of one another in order at the bottom part of the concave part for attachment 93*b* formed between a pair of L shaped magnetic poles 93*a*, and by screwing these to the bottom of said bottom part with a non-magnetic material screw 96, made of such as stainless steel and the like fixes the magnet 94 and the magnetic pole 95 to the insert core 91.

This configuration of embodiment is able to virtually avoid magnetic shortages in the magnetic pole 95 and the insert core 91 because the magnetic pole 95 is attached to the insert core 91 through a non-magnetic screw 96 As a result, the magnetic flux from the magnetic pole 95 can be adequately concentrated in the power generating coil and the like, and can achieve the original excellent power generating capacity FIGS. 15 through 20 show a magnetic power generator rotor B4 according to another configuration for implementing this invention. 101 is an insert core and is comprised of the pole piece part 104 and the counter weight part 105 that have the axial hole part 102 between them and secure the magnet 103.

Also, 106 is the first pair of magnetic poles formed as one unit with said insert core 101, and 107 is the second pair of magnetic poles made of a magnetic material and fixed between said first pair of magnetic poles 106 through said magnet 103 by a non-magnetic screw (bolt) 108 and a nut 109, and is press formed.

Furthermore, 110 are ribs for preventing a shift in position provided on the attachment surface of said magnet 103 so as to bring said magnet 103 between the ribs, 111 are concave hole parts engaging said screw 108, and 112 is a concave hole part that is wider than said concave hole parts 111. These are also open at the other side of the insert core 101.

Figure 20:
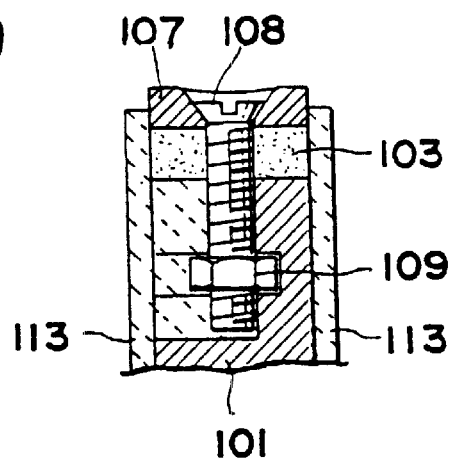
FIG. 20 is a side sectional view showing a partially broken down magnetic power generator rotor in this invention after being ejection formed.
Figure 21:
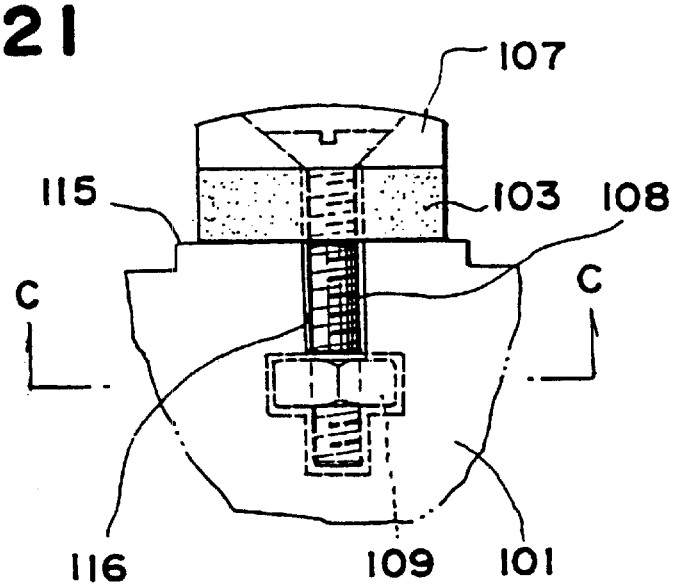
FIG. 21 is a front view of the principal parts showing a magnetic power generator rotor according to another configuration for implementing this invention.
Figure 22:
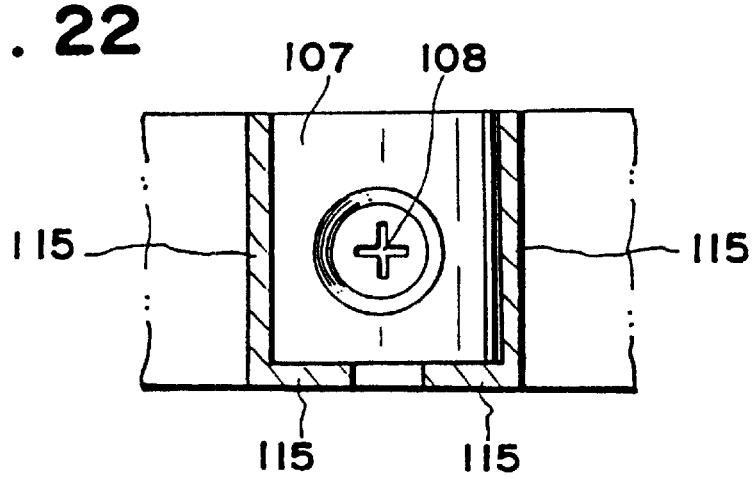
FIG. 22 is a plane view of the magnetic power generator rotor in FIG. 21.

113 was formed by carrying out such as ejection forming into disc shape on the assembled insert core 101, and is for example a synthetic resin layer of non-magnetic material as shown in FIG. 20.

Next, the procedure for assembling said insert core 101 will be described. First, said insert core 101 is formed with a powder such as for example iron oxide that is a magnetic material using a metal mold with a pole piece part 104 having the first pair of magnetic poles 106 as shown in the drawing, the concave parts 111 and 112 as shown in FIG. 195 for installing a screw 108 and a nut 109, the ribs 110 for preventing a shift in the position of the magnets provided between said first pair of magnetic poles 106, and for example a tapered axial hole part 102, and a balance weight 105 on the other side of said axial hole 102.

Also, at about the center between said magnet 103 and the second pair of magnetic poles 107 perforations 103*a* and 107*a* are provided. Said screw 108 is inserted into these perforations 103*a* and 107*a* and a nut 109 is attached to a suitable position on said screw 108.

To the insert core 101 are installed from the side using a fising tool, the assembled unit of said magnet 103 and the second pair of magnetic poles 107 provided with said screw 108 and nut 109 so as to place the magnet 103 between the ribs 110 for prevention of a shifting in position provided between the first pair of magnetic poles 106 in the pole piece part 104 of said insert core 101; and also the screw 108 is installed so as to be placed in the concave hole part 111 and the nut 109 in the concave hole part 112.

Next, said magnet 103 and the second pair of magnetic poles 107 installed with said fixing tool is to be secured but in the case of this invention these can be tightened and fixed by simply turning said screw 108 in a tightening direction against the nut 109 that is restricted from turning by the concave hole part 112.

Figure 16:
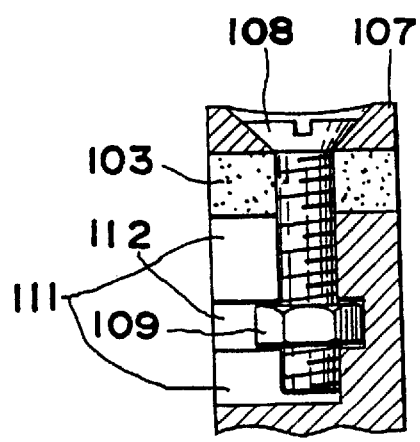
FIG. 16 is a side sectional view showing the partially broken down magnetic power generator rotor in FIG. 15
Figure 17:
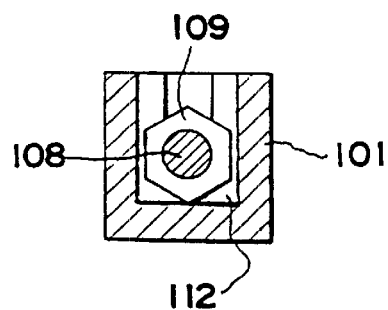
FIG. 17 is a line A—A sectional view of FIG. 13.

That is, because the concave hole part 112 that fits in said nut 109 provided in said insert core 101 is, as shown in FIGS. 16 and 17, a hole that has been made only slightly larger than the opposing aforementioned nut 109. The opposing part of the nut 109 comes in contact with the wall of said concave hole part 112 and even when the screw 108 is tightened said nut 109 itself does not rotate.

Figure 18:
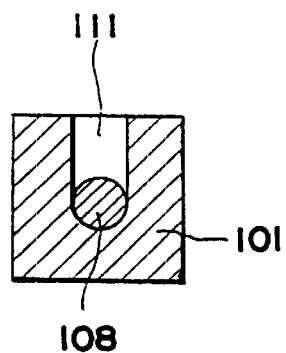
FIG. 18 is a line B—B sectional view of FIG. 15
Figure 19:
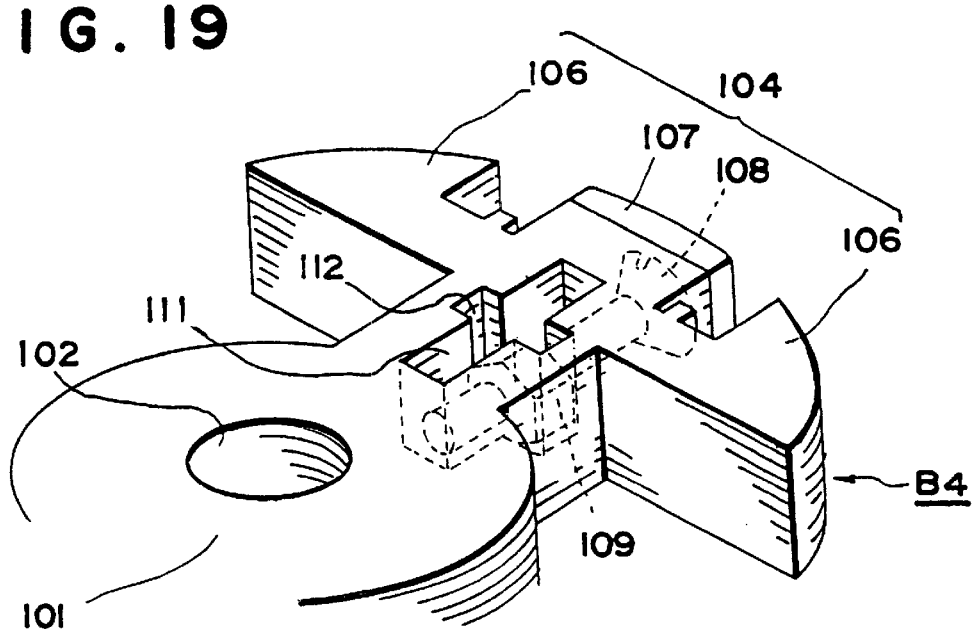
FIG. 19 is a dismantle view showing the partially broken down magnetic power generator rotor in FIG. 15.

On one hand, because the concave hole part 111, in which said screw 10S fits into, has a clearance for said 108 to smoothly rotate in as shown in FIG. 18, no difficulty whatsoever occurs in the tightened fixture of said magnet 103 and the like.

Furthermore, if the position of said concave hole part 112 is located in a place away from the magnetic field of said magnet 10)3, a magnetic body can be used. Also, said axial hole part 102 was made a tapered hole for easy release of the mold when forming, but it can also be a straight hole.

Next, the assembled insert core 101 including such as said magnet 103 and the magnetic poles 107, is set up to expose a part of the outer-most part of the first pair of magnetic poles 106 and the second pair of magnetic poles 107 of the insert core 101 to the metal mold for ejection molding use which is a non-magnetic material such as for example synthetic resin, and the outer shape is formed into a disc shape as shown in FIG. 20 by the ejection forming of the synthetic resin. The rotor is completed in this way.

Further, depending on needs, the provision of a cooling fan for engine cooling to said disc shape rotor is optional.

Generally, a pre-magnetized magnet is used for said magnet 103 but depending on the case, there are times when a magnetic body that has not been magnetized is used. In such case, the magnetic body can be magnetized into a magnet after said ejection forming.

Also, in said configuration of embodiment, a case carrying out ejection molding with synthetic resin, which is a non-magnetic body, was shown, but ejection molding with such as the conventional aluminum die cast can be carried without being restricted to synthetic resin to achieve the same results as that in said configuration of embodiment.

FIGS. 21 through 26 show another configuration of the magnet 103 and the magnetic poles 107. In this configuration of embodiment, the ribs 113 for preventing a slip in position have been provided to prevent the bottom part of said magnet 103 from shifting in the direction of the thrust (one thrust direction in this configuration of embodiment) and in the direction of intersection.

Figure 23:
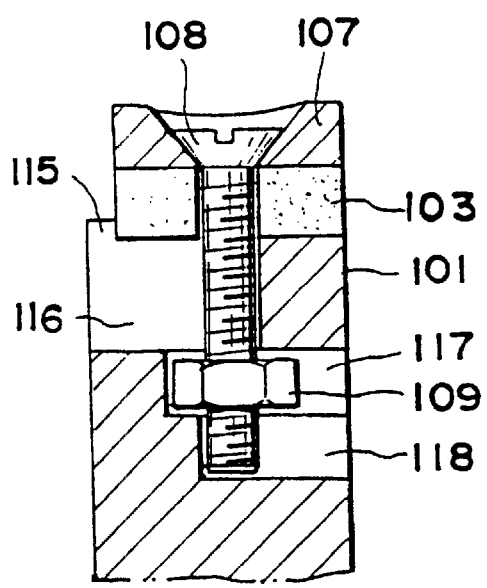
FIG. 23 is a side sectional view of the magnetic power generator rotor in FIG. 21.
Figure 25:
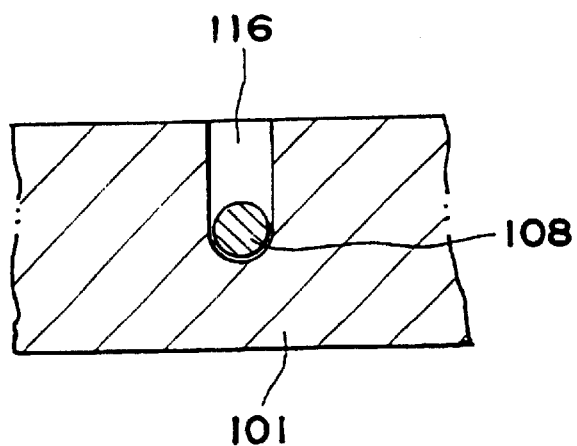
FIG. 25 is a line C—C sectional view of FIG. 21.

Also, in this configuration of embodiment, on one side of said ribs 115 for preventing a shift in position in the thrust direction and the insert core 101, as shown in FIGS. 23 and 25, a concave hole part 116 has been provided enabling the insertion of a screw 108 attached to said magnet 103.

Figure 24:
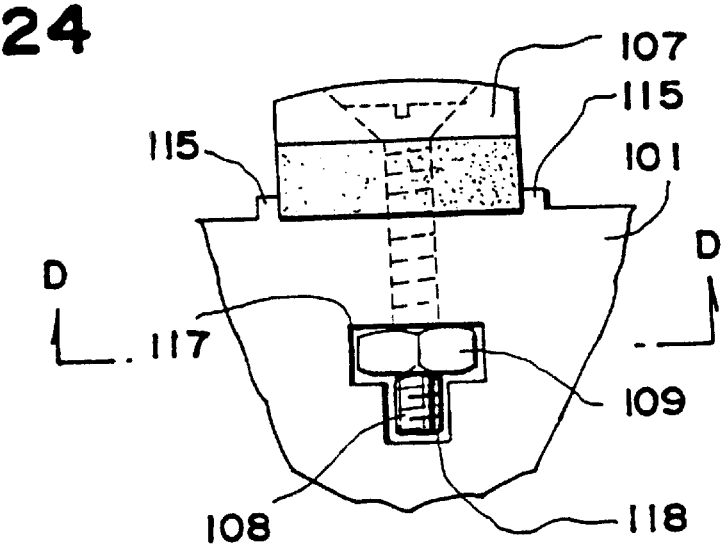
FIG. 24 is a back view of the magnetic power generator rotor in FIG. 21
Figure 26:
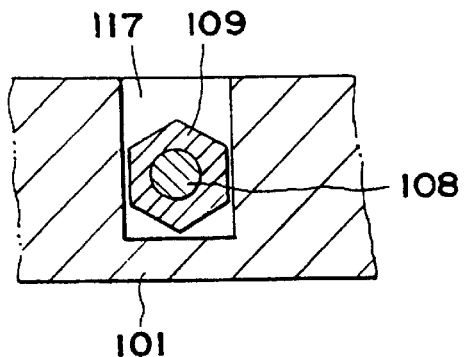
FIG. 26 is a line D—D sectional view of FIG. 21.

On one hand on the other side of said insert core 101, as shown in FIGS. 24 and 26, there is provided a concave hole part 117 enabling said nut 109 to be inserted from the other side and a concave hole part 118 in which the bottom end of said screw 108 is seated.

In this configuration of embodiment, first the nut 109 is inserted in said concave hole part 117 from said other side of the insert core 101, next the screw 108, which has been passed through said magnet 103 and the second magnet poles 107, is screwed in from said one side, then at this time the end of the screw 108 is screwed into the nut 109.

Subsequently, with said second magnetic poles 107 in the condition of being positioned in the ribs 11S for preventing a shift in position, by screwing said screw 108 into said nut 109 with a tool, said magnet 103 can be fixed firmly in the insert core 101 without resulting in a shift of position.

In other words, in this configuration of embodiment, the ribs 115 for preventing a shift in position, which have been provided at the established position for the insert core 101 of the magnet 103, can be easily prevented from shifting in either the from, back, left or right direction when assembling the magnet 103 with the screw 108 and the nut 109 without using an engagement tool. Therefore, the magnet 103 and the second magnetic poles 107 will be safely secured in their established positions even after assembling.

Figure 27:
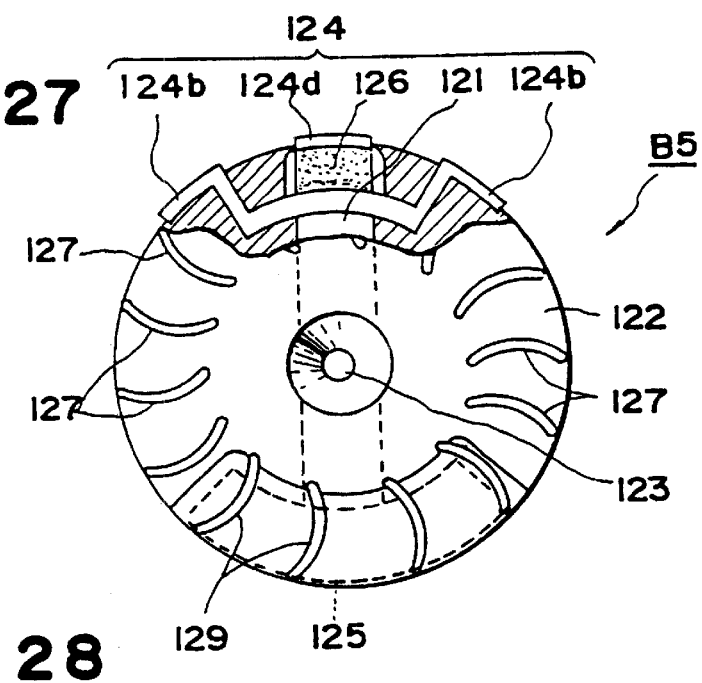
FIG. 27 is a front view showing a partially broken down magnetic power generator rotor according to another configuration for implementing this invention.
Figure 28:
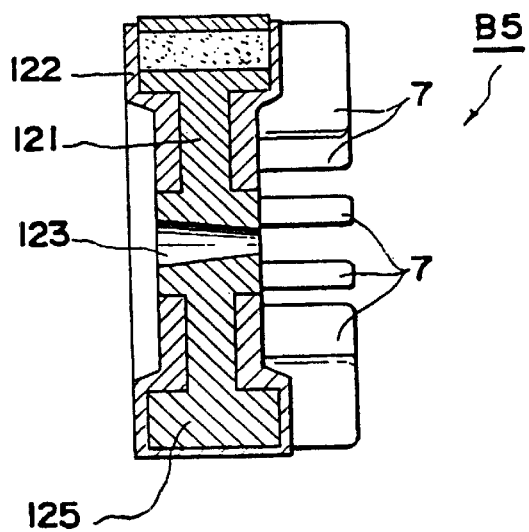
FIG. 28 is a longitudinal section view of the rotor shown in FIG. 27

FIGS. 27 and 28 show another configuration of embodiment of a magnetic power generator rotor B5, and 121 is an insert core having an approximately H shape as a whole, and 122 is a non-magnetic material layer made of synthetic resin, aluminum die cast and the like which has been ejection molded in disc shape so as to cover the insert core 121.

Also, said insert core 121 has on one side a pole piece 124 having a magnet 126 and on the other opposite side a counter weight 125 with an axial hole part 123 between them.

Figure 29:
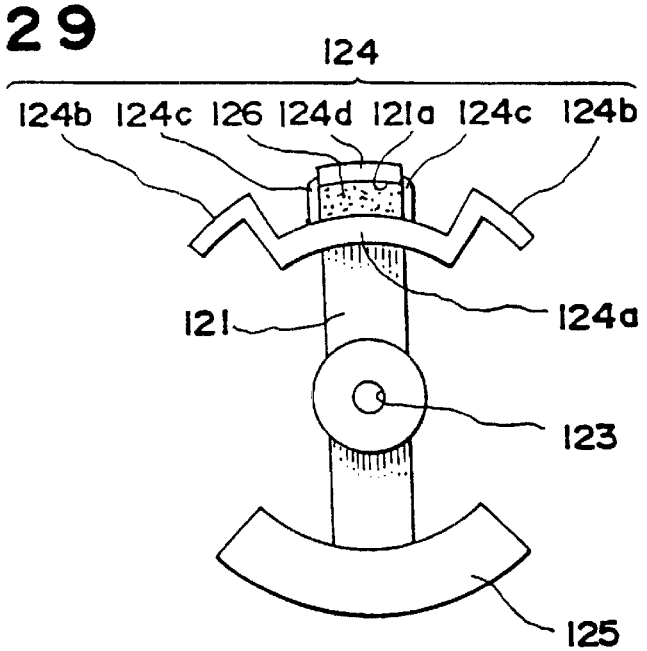
FIG. 29 is a front view showing the insert core in FIG. 27.
Figure 30:
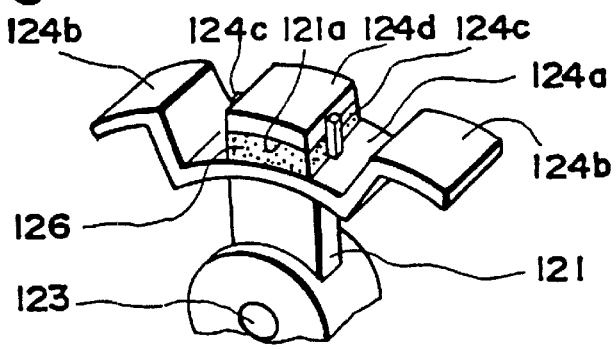
FIG. 30 is a dismantle view of the principal parts showing the insert core in FIG. 27.
Figure 31:
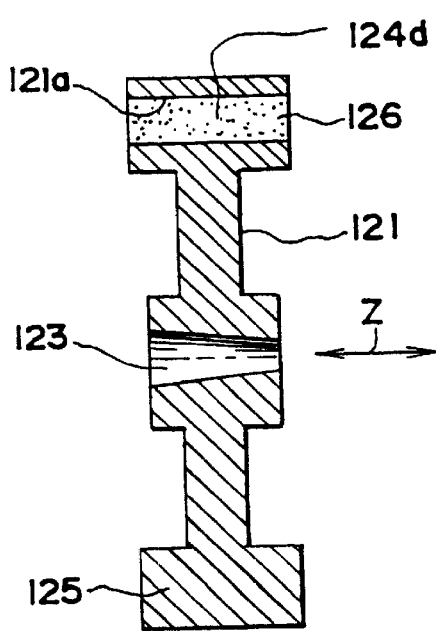
FIG. 31 is a longitudinal section view showing the insert core in FIG. 27.

Of these, as shown in detail in FIGS. 29 30 and 31, the pole piece 124 is comprised of the L shape magnetic poles 124b protruding from both ends of a l shape magnetic pole piece 124a; the magnetic poles 124d as magnetic material (plates) supported by the supporting column 124c erected as one unit on said magnetic pole piece 124a; and the magnet 126 provided in an open hole 121 a formed between the magnetic piece 124a, the supporting column 124c and the magnetic pole 124d.

Here, this magnet 126 is equal in axial line directional length with each of the magnetic poles 124b and 124d, therefore the magnetic flux from magnet 126 is concentrated in magnetic pole 124d and very efficiently affects an ignition coil and an power generating coil which are not shown in the drawing.

Also, said counter weight part 125 has the necessary and adequate weight to match the weight of said pole piece part 124, and is designed to improve the inertial moment against the insert core 121, and overall is of an approximately arc shape.

The insert core having the axial hole part 123, the pole piece part 124 and the counter weight part 125 is formed as one unit using one metal mold with a magnetic body made from sineered alloy. Consequently, the shape and size of this insert core 121 can be optionally selected, and the weight and production cost can be lowered in comparison to conventional layered insert cores. tapered hole with its diameter changing in the axial line direction. and because this tapered hole is formed by the metal mold simultaneously with the fonTilnu of said insert core, it is possible to finish the inside surface smoothly.

For this reason, a part of the tapered hole part of the rotor having such a tapered hole as the axial hole part 123 w 11 fit tightly so as to bite into the outer surface of the crankshaft when installing on the crankshaft of an internal combustion engine. Consequently, said rotor can be accurately installed in the established position on the crankshaft.

An insert core 121 such as shown in FIGS. 29 through 31 is positioned with a metal mold that is not shown in the drawing, and each part excluding the axial hole part 123 is ejection formed with synthetic resin, or formed by aluminum die casting, and coated with a non-magnetic material layer 122 such as shown in FIGS. 27 and 28, to form a disc shape rotor.

Also, a multiple of cooling fans 127 are formed as one unit on one side of this disc shape non-magnetic material layer 122. These cooling fans 127 provide ventilation with the rotation of such a rotor, and is used for cooling the engine.

Also, the outer surface part of said magnetic poles 124b and 124d are slightly exposed on the outside of said non-magnetic material layer 122, and thus can efficiently supply the magnetic flux from the magnet to the power generating coil and the ignition coil and the like. Consequently, it is possible to raise the power generating efficiency of each of these coils.

Figure 32:
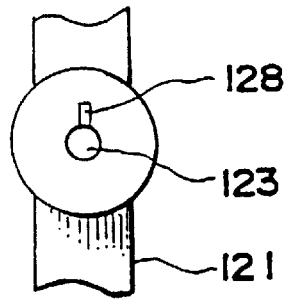
FIG. 32 is a front view of the principal parts showing another example of the axial hole part area in this invention.
Figure 33:
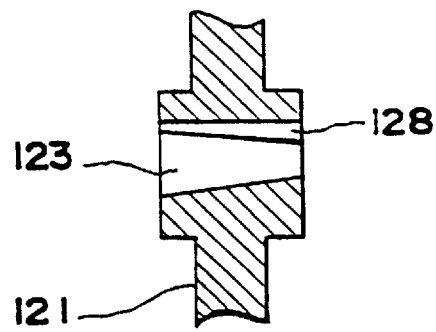
FIG. 33 is a longitudinal section view of the axial hole part area in FIG. 32.

Also, the axial hole part 123 provided at the center part of an insert core 121 such as described above has a tapered hole, but as shown in FIGS. 32 and 33 by forming as one unit a key groove 128 in the axial direction in the axial hole part 123 when forming said insert core 121, the rotation block on the crankshaft of the rotor can be made reliable when fitting to the key protuberant pre-formed on the crankshaft.

Further, in case a key protuberant cannot be provided on the crankshaft itself, by inserting a piece in the key groove 128 the rotation block for the rotor against said crankshaft can be reliably accomplished.

Figure 34:
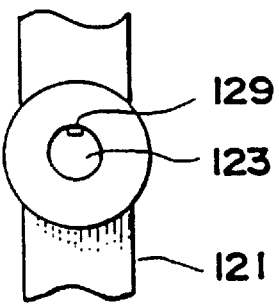
FIG. 34 is a front view of the principal parts shown in another example of the axial hole part area in this invention
Figure 35:
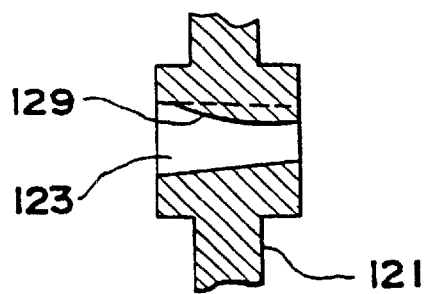
FIG. 35 is a longitudinal section view of the axial hole area in FIG. 34.

Also, as shown in FIGS. 34 and 35, by providing the key protuberant 129 as one unit in the axial direction in said axial hole part 123 at the time of said forming, the blocking of rotation of the rotor on the crankshaft can be reliably accomplished when fitted to the key groove pre-formed on the crankshaft.

Further, said key groove 128 and key protuberant 129 can be formed simultaneously with the forming of the crankshaft, therefore the processing steps for the rotor will not increase for the purpose of fomliing said groove and protuberant. In short, the need to implement a separate step for processing the key groove 128 and the key protuberant 129 after forming the axial hole part 123 will be eliminated, and also the need to prepare separate key parts will be eliminated, and it will be advantageous from operational and economical points.

Figure 36:
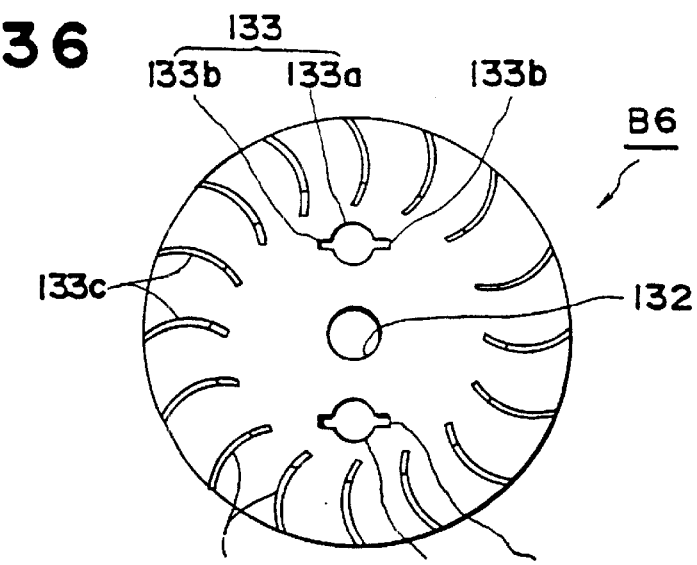
FIG. 36 is a front view showing a magnetic power generator rotor according to another configuration for implementing this invention.

FIG. 36 shows a rotor B6 according to another configuration of embodiment of this invention, which has an axial hole 132 at its center part for fitting, with the engine crankshaft. This axial hole 132 is formed in a tapered shape as needed.

Said rotor has in opposing positions (opposing positions of 180 degrees to each other) a pole piece part (not shown in the drawing) consisting of a magnet and magnetic poles and a counter weight (not shown in the drawing) with the axial hole 132 between them.

Also, 133 is multiple locations of said rotor B6, and here they are perforations for removal that have been formed in 2 places. These removal perforations 133 consist of a perforation 133a through which a rod shape extraction part that is part of the removal tool described later on can be passed through, and a pin perforation hole 133b through which an engagement pin connected to said extraction part as a continuation of the through hole 133a. Moreover, 133c are cooling fans placed apart at equal distances.

Figure 37:
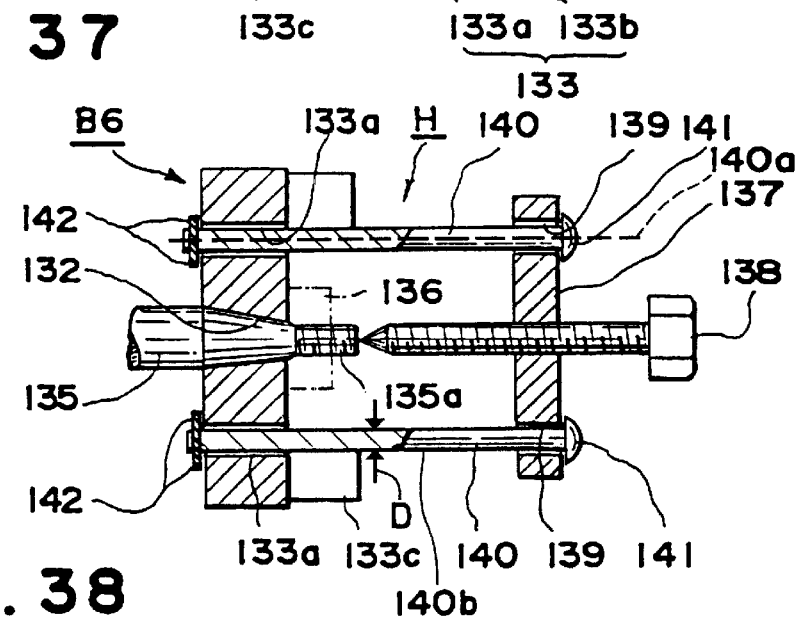
FIG. 37 is a partially cut off sectional view showing a magnetic power generator rotor removing tool according to one configuration for implementing this invention

FIG. 37 shows said removal tool and the removal structure for removing said rotor B6 from the crankshaft In said drawing 135 is the crankshaft fitted to said axial hole 132 of the rotor 131.

A nut 136 is fitted tightly on a male screw 135a at the tip of the crankshaft 135, and the rotor B6 is fixed so that it will not easily come off of crankshaft 135. Further, this nut 136 can be removed at the time of the above mentioned removal operation.

Also, 137 is for example a disc shape plate comprising a support for removal tool H, and at the center of this plate 137 is screwed in a screw part 138 such as a bolt whose tip is in contact with the end part of said crankshaft 135, and furthermore perforated holes 139 have been provided in a multiple of locations on this plate 137.

140 is an extraction part of said removal tool H passed through these perforated holes 139, and a head part 141 for blocking removal has been provided at one end and at the other end an engagement pin 142 has been provided as an engagement part. The extraction part 140 has a longitudinal axis 140a and is non-threaded as shown by surface 140b. Further, extraction part 140, exclusive of said head part 141, has a maximum outer dimension D.

Furthermore, the diameter of said other end part of the removal part 40 is slightly smaller than the perforated hole 133a of the removal perforation 133 shown in FIG. 1, and the engagement pin 142 has a length freely enabling a through passage through said pin perforation hole 133b, and in the area other than this pin perforation 133b, extends outside of the diameter o the perforation hole 133a.

Figure 38:
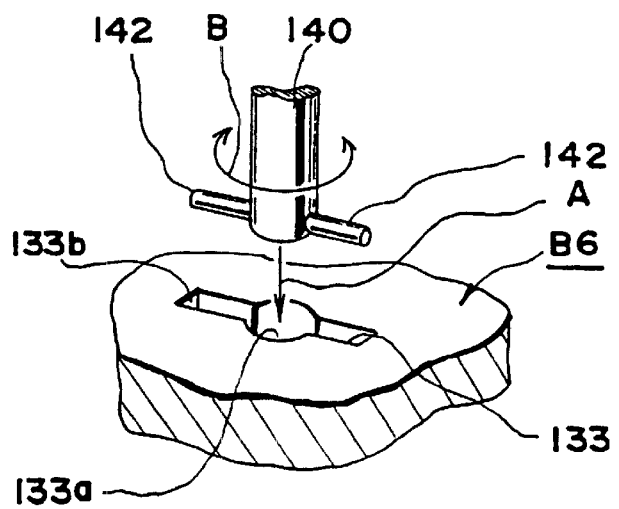
FIG. 38 is a dismantle view of a principal part showing the relation between the perforation for removal and the extraction part in FIG. 37.

Consequently, in a rotor removal tool H with such a structure. when removing a rotor B6 from a crankshaft 135, said other end of each removal part 140 is first inserted in the A direction of the arrow in removal perforation 133 as shown in FIG. 38

This insertion is accomplished by inserting the extraction part 140 itself into the perforation 133a and the engagement pin 142 into perforation 133a of said removal perforations 133.

Next, after insertion, each removal part 14 per se is rotated at for example 90 degrees in the B direction of the arrow at said perforation 13. As a result, each engagement pin 14 reaches the perforation 133a area behind the rotor B6, and when said screw part 138 is screwed into the plate 137 under such condition, the engagement pin 142 will come in contact with the rear surface of the rotor B6 in the perforation 143a area.

Also, with the screwing in of this screw part 138, after the tip hits the end surface of said crankshaft 135, the plate 137 will move in the opposite direction (midright side in FIG. 37) to the crankshaft 135.

For this reason, the engagement pin 142 at the end of said extraction part 140 that is blocked on the plate 137 is turned in the extraction direction (mid-right side of FIG. 37) from the rear side of the rotor B6, and this rotor B6 is subject to a strong pulling torque and is smoothly removed from the crankshaft 135.

Figure 39:
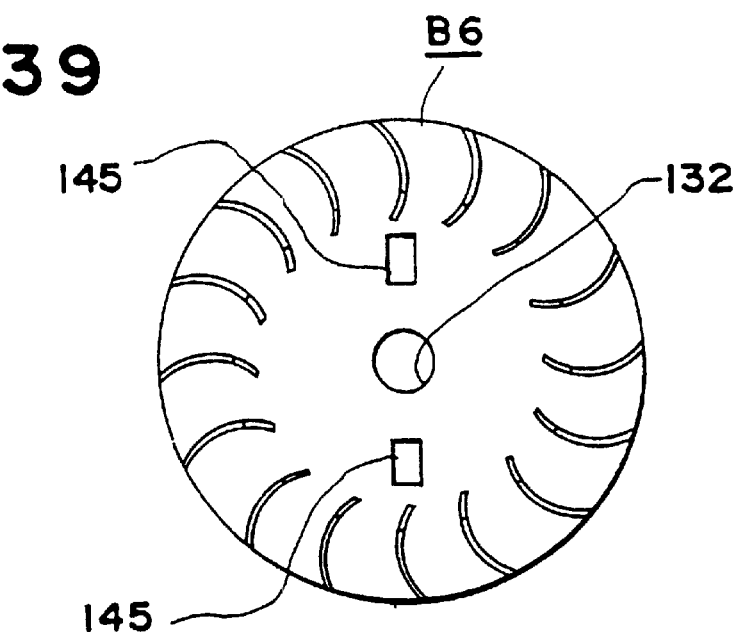
FIG. 39 is a front view showing a magnetic power generator rotor according to another configuration for implementing this invention.
Figure 40:
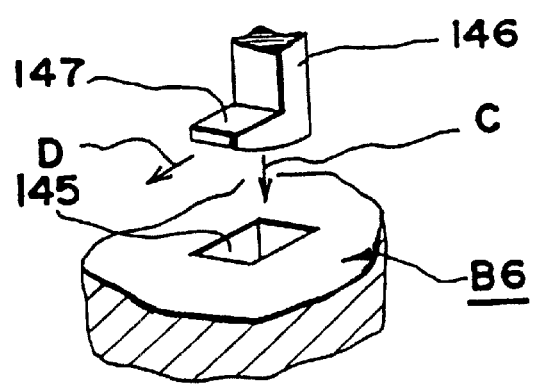
FIG. 40 is a dismantle view of a principle part showing the relation between the perforation for removal and the extraction part in FIG. 39.

FIGS. 39 and 40 show another configuration for implementing this invention. In this configuration of embodiment, a multiple (2 here) of rectangular removal perforations 145 are formed on rotor B ), and against the removal perforations 145 there are the insertion hook parts 147 as engagement parts of the end of extraction part 146 attached to the plate 7 along the surface of the plate so as to be moveable in a direct line.

Figure 41:
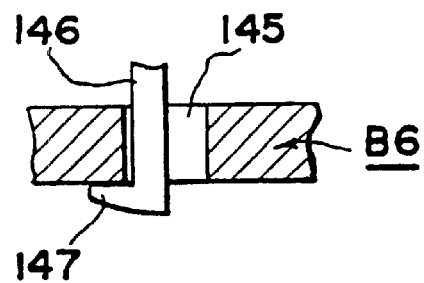
FIG. 41 is a sectional view of a principal part showing the condition of engagement of the perforation for removal and an extraction part in FIG. 40.

Consequently, in this configuration of embodiment, after inserting the hook part 147 of the end of the extraction part 146 into the perforation 145 in the C direction of the arrow similarly as described above, by moving the extraction part 146 on said plate 147 in a direct line toward the D direction of the arrow as shown in FIG. 5, the hook part 147 can be positioned behind the rotor B6 as shown in FIG. 41. Subsequently, by screwing in the screw part 138, the removal of said rotor B6 can be carried out similarly as described above.

Figure 42:
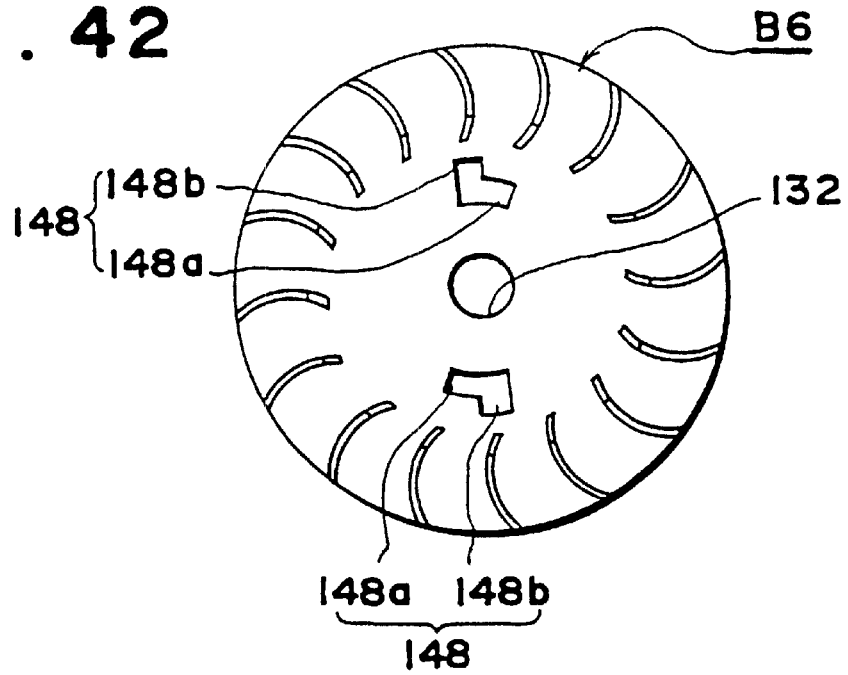
FIG. 42 is a front view showing a magnetic power generator rotor of another configuration for implementing this invention.
Figure 43:
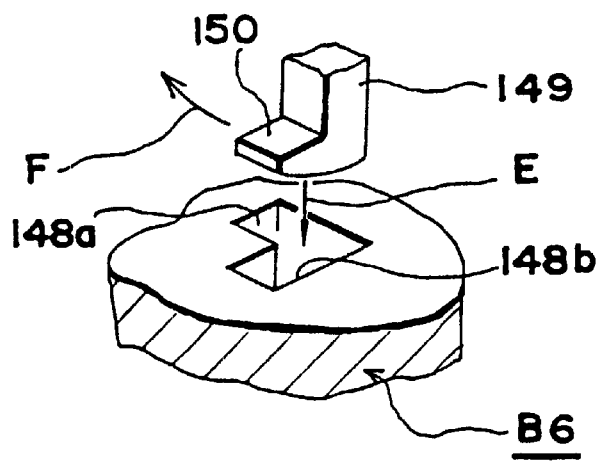
FIG. 43 is a dismantle view of a principal part showing the relation between the perforation for removal and an extraction part in FIG. 42

FIGS. 42 and 43 show another configuration for implementing this invention. In this configuration of embodiment, a multiple (2 here) of L shape removal perforations 148 are formed on the rotor B6, and for these removal perforations 148 the hook part 150 as an engagement part of the end of extraction part 149 attached to the plate 137 is made insertable.

Further said removal perforations 148 are comprised of the circumference directed hole 148a along the direction of the circumference of the rotor B6, and the diameter directed hole 148 extending in the direction of the radius of the rotor B6.

Consequently, in this configuration of embodiment, similar to that shown in FIG. 37, after inserting the hook part 150 of the extraction part 149 supported on the plate 137 in the E direction of the arrow to the diameter directed hole 148 of the removal perforation 148, said plate 137 is turned in the F direction of the arrow for only a few degrees.

Figure 44:
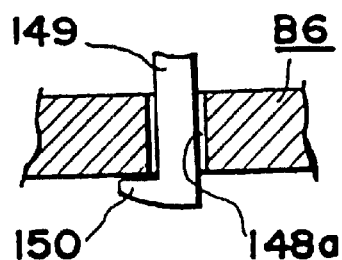
FIG. 44 is a section view of a principal part showing the condition of engagement of the perforation for removal and an extraction part in FIG. 43.

By doing this, after positioning said hook part 150 behind the rotor B6 in the area of said circumference directed hole 148a, by screwing in said screw part 138 as shown in FIG. 44, the hook part 150 can be blocked behind the rotor B6, and by continuing to screw in the screw part 138 the removal of the rotor B6 can be carried out similarly as described above.

Further, in this case, by moving horizontally after inserting the extraction part 149 itself in the diameter directed hold 148b without turning said plate 137, the hook part 150 can be positioned behind the rotor B6, therefore as described above the removal of rotor B6 can be carried out.

Furthermore, without being restricted to the hooks 147 and 150 provided at the ends of said extraction parts 146, and 149 and by using all other protuberance instead, it goes without saying that the extraction of the rotor B6 can be carried out as described above.

What is claimed is:

1. A method of using a rotor extraction tool to axially extract a rotor that is provided with a plurality of non-cylindrical axial perforations from a crankshaft that has an axial end in which the rotor extraction tool comprises: a support plate; an axial force generating part supported on the support plate such that the axial force generating part may be moved axially away from the support plate, the axial force generating part including a tip adapted to contact the axial end of the crankshaft and the axial force generating part supported on the support plate such that when the axial force generating part is moved axially away from the support plate, the tip pushes against the axial end of the crankshaft to apply an axial force to the axial end of the crankshaft; a plurality of extraction parts supported in the support plate such that the extraction parts may slide axially relative to the support plate, each of the extraction parts being non-threaded and having two axial ends, one axial end having an expanded head portion to prevent the axial end from sliding through the support plate, and a non-cylindrical engagement part formed proximate the other axial end of the extraction parts, the extraction parts having a maximum outer dimension measured perpendicular to a longitudinal axis thereof, the non-cylindrical engagement part having a shape that allows the engagement part to be slid through the non-threaded perforations provided in the rotor when the engagement part is oriented one way and prevents the engagement part from passing through the perforations provided in the rotor when the engagement part is oriented in another way, the perforations having a shape that is substantially complementary to the engagement parts, and wherein the shape of the perforations and non-cylindrical engagement parts is such that when the non-cylindrical engagement parts are received in the rotor, the axial force generating part is automatically axially aligned with the crankshaft, wherein when the axial force generating part is moved axially away from the support plate a portion of the extraction parts having the maximum outer dimension remains through the perforations provided on the rotor and wherein the engagement part has a shape that extends beyond the maximum outer dimension of each of the extraction parts, the method comprising the steps of:

arranging the rotor extraction tool so that it is opposed to the rotor;

positioning the engagement parts through the perforations provided in the rotor so as to axially align the axial force generating part with the crankshaft;

reorienting the engagement parts relative to the perforations provided in the rotor so that the engagement parts engage the rotor;

sliding the tip of the axial force generating part into contact with the axial end of the crankshaft; and causing the axial force generating part to be moved axially away from the support plate so that the tip pushes against the axial end of the crankshaft, which results in the rotor being pushed axially relative to the crankshaft.

2. The method of claim 1, wherein the axial force generating part is a screw part threaded into the support plate, and wherein the step of causing the axial force generating part to be moved axially away from the support plate is performed by threading the screw part into the support plate so that the tip of the screw part pushes against the axial end of the crankshaft.

* * * * *